(12) United States Patent
An et al.

(10) Patent No.: US 12,394,886 B2
(45) Date of Patent: Aug. 19, 2025

(54) DISPLAY STRUCTURE INCLUDING DIELECTRIC LAYER AND ELECTRONIC DEVICE INCLUDING SAME

(71) Applicant: SAMSUNG ELECTRONICS CO., LTD., Suwon-si (KR)

(72) Inventors: Jungchul An, Suwon-si (KR); Seongjun Kim, Suwon-si (KR); Hoyeon Kim, Suwon-si (KR); Kwanghee Ryu, Suwon-si (KR); Youngjae Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 18/321,224

(22) Filed: May 22, 2023

(65) Prior Publication Data

US 2023/0291092 A1 Sep. 14, 2023

Related U.S. Application Data

(63) Continuation of application No. PCT/KR2022/003095, filed on Mar. 4, 2022.

(30) Foreign Application Priority Data

Mar. 5, 2021 (KR) .......................... 10-2021-0029309
Aug. 11, 2021 (KR) .......................... 10-2021-0106174
Dec. 23, 2021 (KR) .......................... 10-2021-0186462

(51) Int. Cl.
*G06F 1/16* (2006.01)
*H01Q 1/24* (2006.01)
*H04M 1/02* (2006.01)

(52) U.S. Cl.
CPC ........... *H01Q 1/243* (2013.01); *G06F 1/1616* (2013.01); *G06F 1/1656* (2013.01); *G06F 1/1681* (2013.01); *H04M 1/0216* (2013.01)

(58) Field of Classification Search
CPC combination set(s) only.
See application file for complete search history.

(56) References Cited

U.S. PATENT DOCUMENTS 6,512,483 B1 1/2003 Holden et al.
8,379,164 B2 2/2013 Ji et al.
(Continued)

FOREIGN PATENT DOCUMENTS

CN 110134188 12/2011
CN 110134188 A 8/2019
(Continued)

OTHER PUBLICATIONS

International Search Report for PCT/KR2022/003095 mailed Jun. 14, 2022, 5 pages.
(Continued)

*Primary Examiner* — Lisa Lea-Edmonds
(74) *Attorney, Agent, or Firm* — Nixon & Vanderhye, P.C.

(57) ABSTRACT

A display structure according to an embodiment may include: a cover glass forming an outer face of the display structure, a display panel disposed under the cover class, a first dielectric layer having a first periphery formed at least in part on an outer side of a periphery of the display panel, and disposed under the display panel, a second dielectric layer disposed on a first face of the first dielectric layer adjacent to the display panel, and a third dielectric layer disposed on a second face corresponding to the first face of the first dielectric layer. A second periphery of the second dielectric layer and a third periphery of the third dielectric layer, corresponding to the first periphery of the first dielectric layer, may be formed on an inner side of the first periphery. The first dielectric layer may have a first permittivity. The second dielectric layer and the third dielectric (Continued)

layer may each have a permittivity greater than the first permittivity.

25 Claims, 18 Drawing Sheets

(56) References Cited

U.S. PATENT DOCUMENTS

| | | | |
|---|---|---|---|
| 9,569,018 B2* | 2/2017 | Kang | G06F 3/03 |
| 10,292,286 B2 | 5/2019 | Wilson et al. | |
| 10,509,498 B2 | 12/2019 | Moon et al. | |
| 10,688,756 B2* | 6/2020 | Chu | G06F 1/1641 |
| 10,826,004 B2 | 11/2020 | Zhai | |
| 11,048,294 B2 | 6/2021 | Yin et al. | |
| 11,817,307 B2 | 11/2023 | Yuan et al. | |
| 12,141,409 B2* | 11/2024 | Park | G06F 3/046 |
| 12,166,910 B2* | 12/2024 | Kwak | G06F 1/1677 |
| 12,169,423 B2* | 12/2024 | An | G06F 1/1643 |
| 2009/0086306 A1 | 4/2009 | Kothari et al. | |
| 2010/0091202 A1 | 4/2010 | Ostergard | |
| 2016/0187985 A1* | 6/2016 | Lim | H10N 30/857 |
| | | | 345/173 |
| 2016/0190428 A1 | 6/2016 | Lim et al. | |
| 2018/0351117 A1 | 12/2018 | Kim | |
| 2018/0374399 A1 | 12/2018 | Han | |
| 2019/0101960 A1 | 4/2019 | Silvanto et al. | |
| 2019/0146556 A1 | 5/2019 | Mizoguchi et al. | |
| 2019/0252771 A1 | 8/2019 | Yong et al. | |
| 2020/0098830 A1* | 3/2020 | Yang | H10K 59/126 |
| 2020/0280133 A1 | 9/2020 | Avser et al. | |
| 2020/0319672 A1* | 10/2020 | Kim | H04M 1/0268 |
| 2020/0335719 A1 | 10/2020 | Xu et al. | |
| 2021/0193941 A1 | 6/2021 | Li | |
| 2022/0050321 A1 | 2/2022 | Park et al. | |
| 2022/0407219 A1* | 12/2022 | An | H04M 1/0268 |
| 2022/0413556 A1* | 12/2022 | Lee | H04M 1/0268 |
| 2023/0044193 A1* | 2/2023 | Park | G06F 3/0445 |
| 2023/0047246 A1* | 2/2023 | An | H05K 5/06 |
| 2023/0051260 A1* | 2/2023 | An | H04M 1/02 |
| 2023/0095925 A1 | 3/2023 | Kim | |
| 2023/0127293 A1* | 4/2023 | An | G01N 27/02 |
| 2023/0180413 A1* | 6/2023 | An | G06F 3/041 |
| | | | 345/905 |
| 2023/0259173 A1* | 8/2023 | Choung | G06F 1/1637 |
| | | | 361/679.01 |
| 2023/0262914 A1* | 8/2023 | Kang | G06F 1/1681 |
| | | | 361/807 |
| 2023/0291092 A1* | 9/2023 | An | G06F 1/1681 |

FOREIGN PATENT DOCUMENTS

| | | |
|---|---|---|
| EP | 3041059 | 7/2016 |
| EP | 3467614 | 4/2019 |
| KR | 10-2018-0024874 | 3/2018 |
| KR | 20190003257 A | 1/2019 |
| KR | 10-2020-0021085 | 2/2020 |
| KR | 20200021085 A | 2/2020 |
| KR | 102121267 B1 | 6/2020 |
| KR | 10-2021-0016983 | 2/2021 |
| KR | 20210016983 A | 2/2021 |
| RU | 119966 | 8/2012 |
| RU | 2471210 | 12/2012 |
| RU | 2745344 | 3/2021 |
| RU | 2759445 | 11/2021 |
| WO | 2019/126481 | 6/2019 |
| WO | 2019/218584 | 11/2019 |
| WO | 2020/060134 | 3/2020 |

OTHER PUBLICATIONS

Written Opinion of the ISA for PCT/KR2022/003095 mailed Jun. 14, 2022, 4 pages.
Japanese Office Action issued Oct. 1, 2024 in corresponding Japanese Patent Application No. 2023-554078.
Extended European Search Report dated Oct. 15, 2024 issued in European Patent Application No. 22763637.0.
Australian Office Action issued Nov. 16, 2023 in corresponding Australian Patent Application No. 2022229622.
Russian Office Action issued Feb. 8, 2024 in corresponding Russian Patent Application No. 2023125376/05.
Australian Notice of Acceptance issued Feb. 26, 2024 in corresponding Australian Patent Application No. 2022229622.
Partial European Search Report dated Jun. 12, 2024 issued in European Patent Application No. 22763637.0.
Decision on Grant dated Jul. 4, 2024 issued in Russian Patent Application No. 2023125376/05.
Indian Office Action issued Mar. 21, 2025 in corresponding Indian Patent Application No. 202347061879.
Notice of Patent Grant issued Feb. 25, 2025 in corresponding Japanese Patent Application No. JP2023-554078.

* cited by examiner

DISPLAY STRUCTURE INCLUDING DIELECTRIC LAYER AND ELECTRONIC DEVICE INCLUDING SAME

CROSS-REFERENCE TO RELATED APPLICATIONS

This application is a continuation of International Application No. PCT/KR2022/003095 designating the United States, filed on Mar. 4, 2022, in the Korean Intellectual Property Receiving Office and claiming priority to Korean Patent Application No. 10-2021-0029309, filed on Mar. 5, 2021, in the Korean Intellectual Property Office, Korean Patent Application No. 10-2021-0106174, filed on Aug. 11, 2021, in the Korean Intellectual Property Office and Korean Patent Application No. 10-2021-0186462, filed on Dec. 23, 2021, in the Korean Intellectual Property Office, the disclosures of all of which are incorporated by reference herein in their entireties.

BACKGROUND

Field

The disclosure relates to a display structure including a dielectric layer, and an electronic device including the display structure.

Description of Related Art

With a dramatic increase in processing performance of an electronic device such as a smart phone, a large-area display is preferred to effectively provide various functions. At the same time, a demand for making the electronic device small in size still exists to improve portability. In order to satisfy such a demand, a foldable electronic device has been released. The foldable electronic device capable of being folded or unfolded about a connection portion may provide a user with portability and usability.

Meanwhile, with the development of mobile communication technologies, an electronic device including an antenna has been widely distributed. The electronic device may transmit and/or receive a Radio Frequency (RF) signal including an audio signal or data (e.g., messages, photos, moving pictures, music files, games) using the antenna.

In addition, in order to satisfy consumers' purchasing needs, there is an ongoing effort to increase rigidity of the electronic device and strengthen a design aspect while making it slim. As one way of such an effort, the electronic device supplies power to at least part of a housing of the electronic device, so as to be utilized as at least one antenna device for communication of the electronic device.

A foldable electronic device utilizing at least part of a frame or housing as an antenna radiator may include a metal layer for securing rigidity of a flexible display and protecting a display structure. However, since the metal layer occupies at least 50% of the display structure, a material of the metal layer may be changed to a lightweight material to reduce a weight of the electronic device.

However, when the metal layer is formed of such a lightweight material, the lightweight material may have a high permittivity. When a layer formed of a material having a high permittivity forms an outermost edge of the display structure, radiation performance of an antenna adjacent to this layer may be degraded.

SUMMARY

Embodiments of the disclosure provide a device which maintains antenna performance while including a lightweight material.

An electronic device according to an example embodiment may include: a housing including a first side face, a second side face corresponding to the first side face, and a hinge coupling the first side face and the second side face, and capable of switching to a folded or unfolded state about the hinge, a rear cover forming a rear face of the electronic device, a wireless communication circuit disposed inside the housing and configured to transmit and/or receive a signal of a specified frequency by supplying power to at least part of the housing, and a display structure coupled to the housing. The display structure may include: a cover glass forming at least part of a front face of the electronic device, a display panel disposed adjacent to one face of the cover glass, and a first dielectric layer disposed under the display panel. A first periphery of the first dielectric layer may be spaced apart from the first side face by a first distance. The display structure may further include a second dielectric layer disposed on a first face of the first dielectric layer adjacent to the display panel, and a third dielectric layer disposed on a second face of the first dielectric layer facing the rear cover. A second periphery of the second dielectric layer and a third periphery of the third dielectric layer, corresponding to the first periphery of the first dielectric layer, may be spaced apart from the first side face by a second distance greater than the first distance. The first dielectric layer may have a first permittivity. The second dielectric layer and the third dielectric layer may have a permittivity greater than the first permittivity.

A display structure according to an example embodiment may include: a cover glass forming an outer face of the display structure, a display panel disposed under the cover class, a first dielectric layer having a first periphery formed at least in part on an outer side of a periphery of the display panel and disposed under the display panel, a second dielectric layer disposed on a first face of the first dielectric layer adjacent to the display panel, and a third dielectric layer disposed on a second face corresponding to the first face of the first dielectric layer. A second periphery of the second dielectric layer and a third periphery of the third dielectric layer, corresponding to the first periphery of the first dielectric layer, may be formed on an inner side of the first periphery. The first dielectric layer may have a first permittivity. The second dielectric layer and the third dielectric layer may have a permittivity greater than the first permittivity.

An electronic device according to an example embodiment may include: a housing including a first housing forming a first side face of the electronic device, a second housing forming a second side face corresponding to the first side face, and a hinge coupling the first housing and the second housing, and being capable of switching to a folded or unfolded state about the hinge, a wireless communication circuit disposed inside the housing configured to transmit and/or receive a signal of a specified frequency by supplying power to at least part of the housing, and a display structure coupled to the housing. The display structure may include: a cover glass coupled to the housing and forming at least part of a front face of the electronic device, a display panel disposed adjacent to one face of the cover glass, and a first layer having a first periphery formed at least in part on an outer side of a periphery of the display panel. The first layer may include a first region formed at least in part on an inner side from the first periphery, and a second region extending to an outer side from the first region to form the first periphery. The first region may have a first permittivity. The second region may have a second permittivity less than the first permittivity.

According to various example embodiments of the disclosure, it is possible to improve (e.g., reduce) a deterioration of antenna performance, caused by applying a lightweight material to a metal layer.

In addition, according to various example embodiments, it is possible to reduce damage or deformation which may occur in a display structure, caused by applying a lightweight material to a metal layer and forming a stacked structure.

In addition thereto, various effects which are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to the description of the drawings, similar reference numerals may be used to refer to similar or related elements.

DETAILED DESCRIPTION

Hereinafter, various example embodiments of the disclosure are described with reference to the accompanying drawings. However, it should be appreciated that this is not intended to limit the technological features set forth herein to particular embodiments and includes various changes, equivalents, or replacements for example embodiments of the disclosure.

Figure 1:
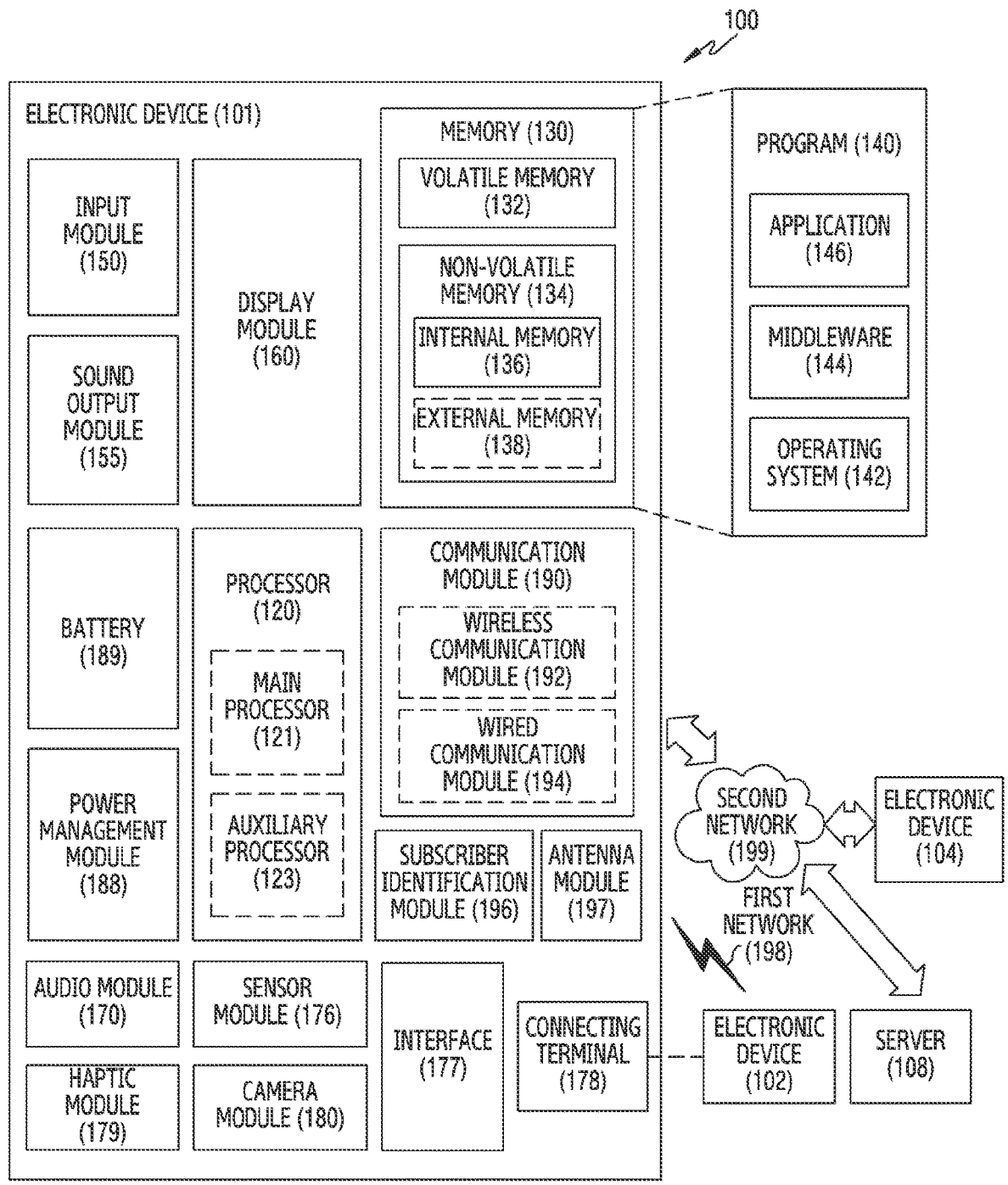
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101. The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101.

According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
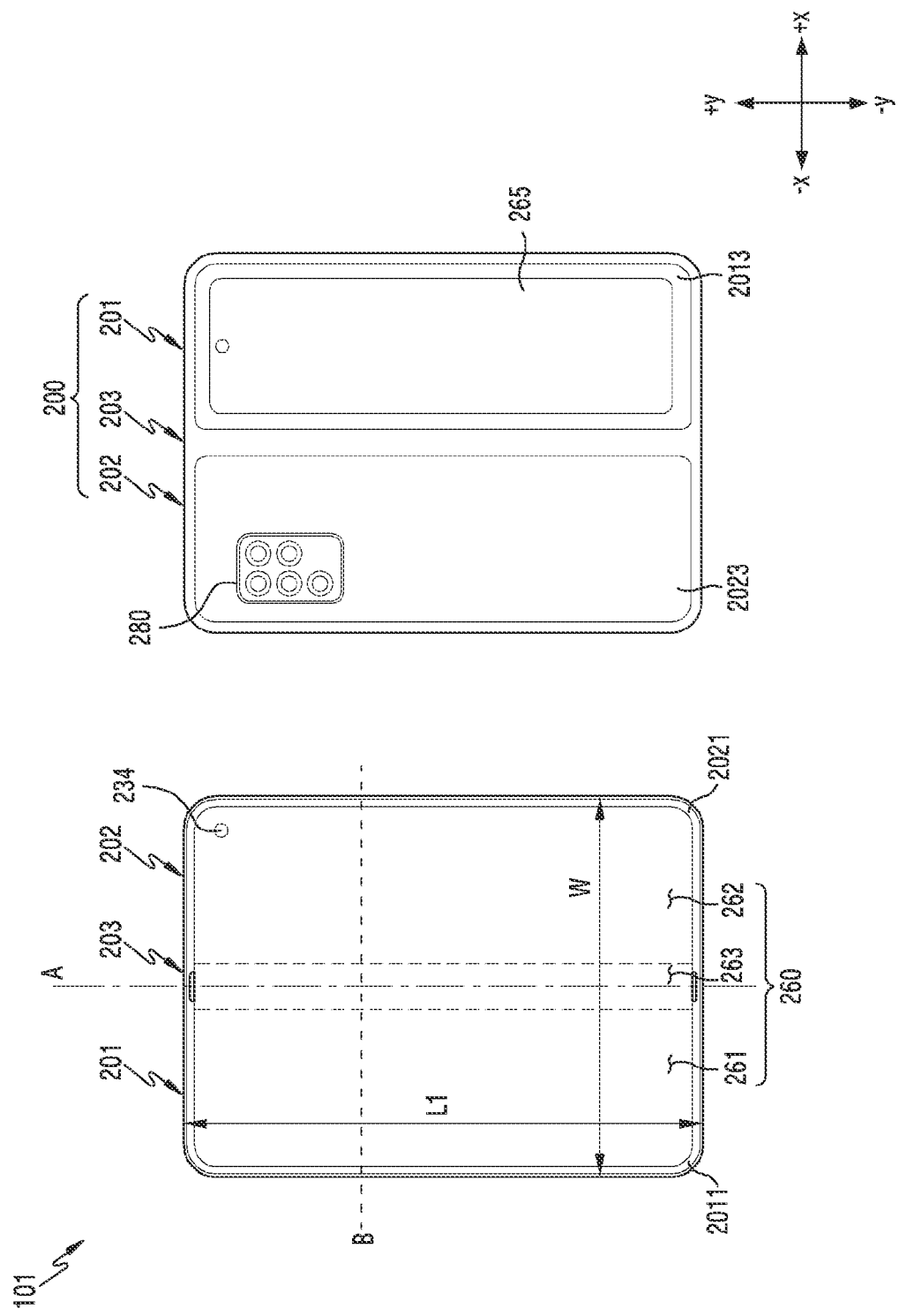
FIG. 2A is a diagram illustrating an electronic device in an unfolded state according various embodiments.
Figure 2B:
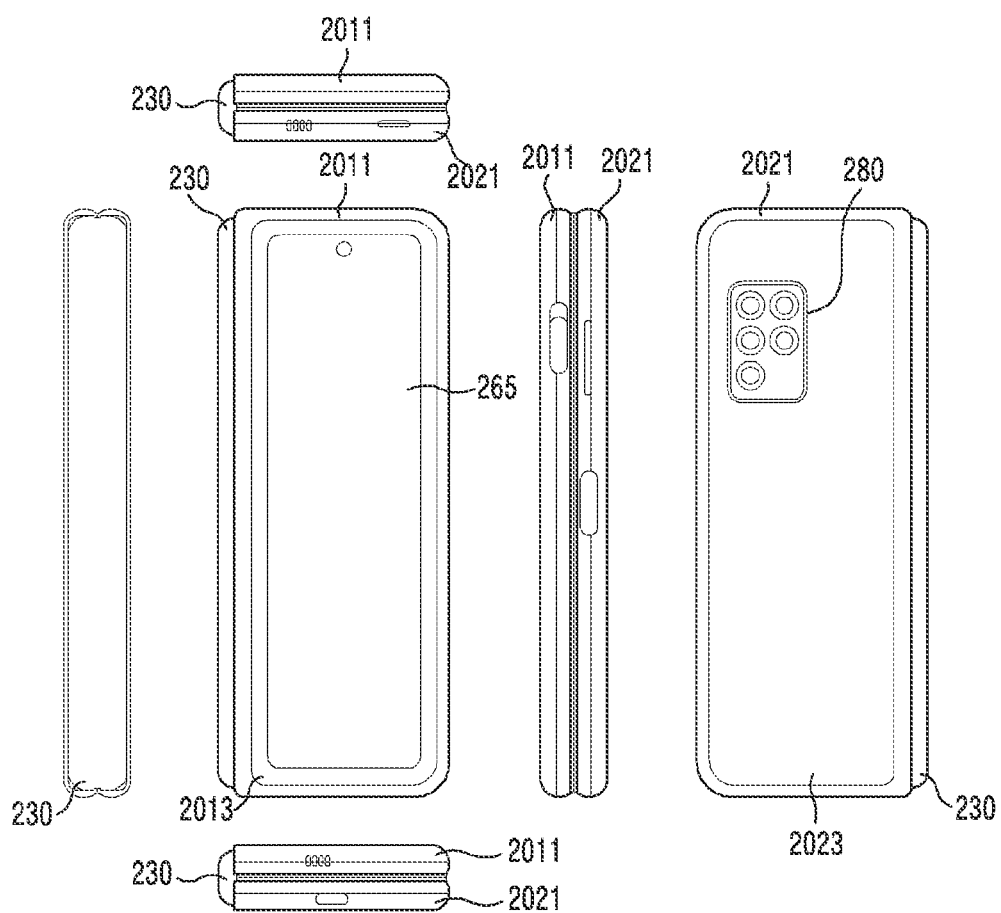
FIG. 2B is a diagram illustrating an electronic device in a folded state according to various embodiments.

FIG. 2A is a diagram illustrating an example electronic device in an unfolded state according to various embodiments. FIG. 2B is a diagram illustrating an example electronic device in a folded state according to various embodiments.

Referring to FIG. 2A and FIG. 2B together, in an embodiment, an electronic device 101 may include a foldable housing (hereinafter, simply referred to as a "housing") 200 and a flexible or foldable display (hereinafter, simply referred to as a "display") 260 disposed inside a space formed by the housing 200. In this disclosure, a face on which the display 260 is disposed may be referred to, for example, as a first face or front face of the electronic device 101. In addition, a face opposed to the front face may be referred to, for example, as a second face or rear face of the electronic device 101. Further, a face surrounding a space between the front face and the rear face may be referred to, for example, as a third face or side face of the electronic device 101.

In an embodiment, in the unfolded state of FIG. 2A, the housing 200 may have a substantially rectangular shape. For example, the housing 200 may have a specified width W and a specified length L1 longer than the specified width W. As another example, the housing 200 may have the specified width W and the specified length L1 substantially equal to, or shorter than, the specified width W. For example, the specified width W may be a width of the display 260. In an embodiment, the housing 200 of the electronic device 101 may be folded or unfolded about a folding axis A substantially parallel to a long periphery (e.g., a periphery facing a y-axis among peripheries of the housing 200 of the electronic device 101 in FIG. 2A) of the rectangle.

In an embodiment, the housing 200 may include a first housing 201, a second housing 202, and a connection portion 203. The connection portion 203 may be disposed between the first housing 201 and the second housing 202. The connection portion 203 may be coupled to the first housing 201 and the second housing 202, and the first housing 201 and/or the second housing 202 may rotate about the connection portion 203 (or the folding axis A).

In an embodiment, the first housing 201 may include a first side face member 2011 and a first rear face cover 2013.

In an embodiment, the second housing 202 may include a second side face member 2021 and a second rear face cover 2023.

In an embodiment, the first side face member 2011 may extend along a periphery of the first housing 201, and may form at least part of a side face of the electronic device 101. The first side face member 2011 may include at least one conductive portion formed of a conductive material (e.g., metal). The conductive portion may act as an antenna radiator for transmitting and/or receiving an RF signal. Similarly to the first side face member 2011, the second side face member 2021 may form part of a side face of the electronic device 101, and at least part of the second side face member 2021 may be formed of a conductive material to act as an antenna radiator.

In an embodiment, the first side face member 2011 and the second side face member 2021 may be disposed at both sides about the folding axis A, and may have a shape generally symmetric about the folding axis A.

In an embodiment, an angle or distance between the first side face member 2011 and the second side face member 2021 may vary depending on whether a state of the electronic device 101 is the unfolded state, the folded state, or an intermediate state.

In an embodiment, the housing 200 may form a recess which accommodates the display 260. The recess may correspond to a shape of the display 260.

In various embodiments, the aforementioned components may include various types of sensors. The sensor may include, for example, at least one of a front camera, a receiver, and a proximity sensor.

In an embodiment, the first rear face cover 2013 may be disposed to the first housing 201 on the rear face of the electronic device 101. The first rear face cover 2013 may have a substantially rectangular periphery. Similarly to the first rear face cover 2013, the second rear face cover 2023 may be disposed to the second housing 202 on the rear face of the electronic device 101.

In an embodiment, the first rear face cover 2013 and the second rear face cover 2023 may have a shape generally symmetric about the folding axis A. However, shapes of the first rear face cover 2013 and the second rear face cover 2023 are not necessarily symmetric to each other. In an embodiment, the electronic device 101 may include the first rear face cover 2013 and/or second rear face cover 2023 having various shapes. In an embodiment, the first rear face cover 2013 may be formed integrally with the first side face member 2011, and the second rear face cover 2023 may be formed integrally with the second side face member 2021.

In an embodiment, the first rear face cover 2013, the second rear face cover 2023, the first side face member 2011, and the second side face member 2021 may form a space in which various components (e.g., a Printed Circuit Board (PCB) or a battery) of the electronic device 101 may be disposed.

In an embodiment, one or more components may be disposed or visually exposed on the rear face of the electronic device 101. For example, at least part of a sub-display 265 may be visually exposed (e.g., visible) through at least one region of the first rear face cover 2013. For example, the sub-display 265 may be visually exposed through the entire region of the first rear face cover 2013, but the region through which the sub-display 265 is visible is not limited to the aforementioned example. As another example, a rear camera 280 may be visually exposed through at least one region of the second rear face cover 2023. As another example, the rear camera 280 may be disposed to one region of the rear face of the electronic device 101.

The housing 200 of the electronic device 101 is not limited to the shape or coupling shown in FIG. 2A and FIG. 2B, and may be implemented in another shape or in another combination and/or coupling of components.

Referring to FIG. 2B, the connection portion 203 may be implemented such that the first housing 201 and the second housing 202 are mutually rotatable. For example, the connection portion 203 may include a hinge structure coupled to the first housing 201 and the second housing 202. In an embodiment, the connection portion 203 may be disposed between the first side face member 2011 and the second side face member 2021 to hide an internal component (e.g., the hinge structure). In an embodiment, the hinge cover 230 may be hidden by part of the first side face member 2011 and second side face member 2021 or may be exposed to the outside according to a state (a flat state or a folded state) of the electronic device 101. For example, in the hinge cover 230, a size of a region exposed to the outside may vary depending on the state (the flat state or the folded state) of the electronic device 101.

For example, when the electronic device 101 is in the flat state as shown in FIG. 2A, the hinge cover 230 may be not be exposed since it is hidden by the first side face member 2011 and the second side face member 2021. For example, when the electronic device 201 is in the folded state as shown in FIG. 2B, the hinge cover 230 may be exposed to the outside between the second side face member 2021 and the second side face member 2021. For example, in case of the intermediate state in which the first side face member 2011 and the second side face member 2021 are folded with a certain angle, the hinge cover 230 may be partially exposed to the outside between the first side face member 2011 and the second side face member 2021. However, in this case, an area in which the hinge cover 230 is exposed may be smaller than that in a fully folded state of FIG. 2B.

In an embodiment, the display 260 may be disposed in a space formed by the housing 200. For example, the display 260 may be mounted on a recess formed by the housing 200, and may form most of the front face of the electronic device 101. For example, the front face of the electronic device 101 may include the display 260, some regions of the first side face member 2011 adjacent to the display 260, and some regions of the second side face member 2021. In addition, the rear face of the electronic device 101 may include the first rear cover 2013, some regions of the first side face member 2011 adjacent to the first rear face cover 2013, and some regions of the second side face member 2021 adjacent to the second rear cover 2023.

In an embodiment, the display 260 may include a flexible display in which at least some regions are transformable to a flat face or a curved face. In an embodiment, the display 260 may include a folding region 263, a first region 261, and a second region 262. The folding region 263 may extend along the folding axis A. The first region 261 may be disposed to one side (e.g., a left side of the folding region 263 of FIG. 2A) with respect to the folding region 263, and the second region 262 may be disposed to the other side (e.g., a right side of the folding region 263 of FIG. 2A). As another example, the first region 261 may be a region disposed to the first housing 201, and the second region 262 may be a region disposed to the second housing 202. The folding region 263 may be a region disposed to the connection portion 203.

A region of the display 260 of FIG. 2A and FIG. 2B is divided by way of non-limiting example, and the display 260 may be divided into a plurality of regions (e.g., at least 4 or 2) according to a structure or a function. For example, although the region of the display 260 may be divided by the folding region 263 and the folding axis A in the embodiment of FIG. 2A, in an embodiment, the region of the display 260 may be divided according to another folding region or another folding axis.

In an embodiment, the first region 261 and the second region 262 may have a shape generally symmetric about the folding region 263. For example, the first region 261 and the second region 262 may include portions having shapes symmetric to each other and portions having shapes asymmetric to each other.

Hereinafter, an operation of the first side face member 2011 and second side face member 2021 according to the state (e.g., the flat state and the folded state) of the electronic device 101 and each region of the display 260 will be described.

In an embodiment, when the electronic device 101 is in the unfolded state (e.g., FIG. 2A), the first side face member 2011 and the second side face member 2021 may be disposed to form an angle of 180 degrees and to face substantially the same direction. A surface of the first region 261 of the display 260 and a surface of the second region 262 may form about 180 degrees to each other, and may face substantially the same direction (e.g., a front direction of the electronic device). For example, the folding region 263 may be coplanar with the first region 261 and the second region 262.

In an embodiment, when the electronic device 101 is in the folded state (e.g., FIG. 2B), the first side face member 2011 and the second side face member 2021 may be disposed to face each other. A surface of the first region 261 of the display 260 and a surface of the second region 262 may form a narrow angle (e.g., between 0 to 10 degrees) and may face each other. At least part of the folding region 263 may be formed of a curved face having a specific curvature.

In an embodiment, when the electronic device 101 is in an intermediate state, the first side face member 2011 and the second side face member 2021 may be disposed to have a certain angle with each other. A surface of the first region 261 of the display 260 and a surface of the second region 262 may have an angle greater than that in the folded state and less than that in the flat state. At least part of the folding region 263 may be formed of a curved face having a certain curvature. In this case, the curvature may be less than that in the folded state.

Figure 3:
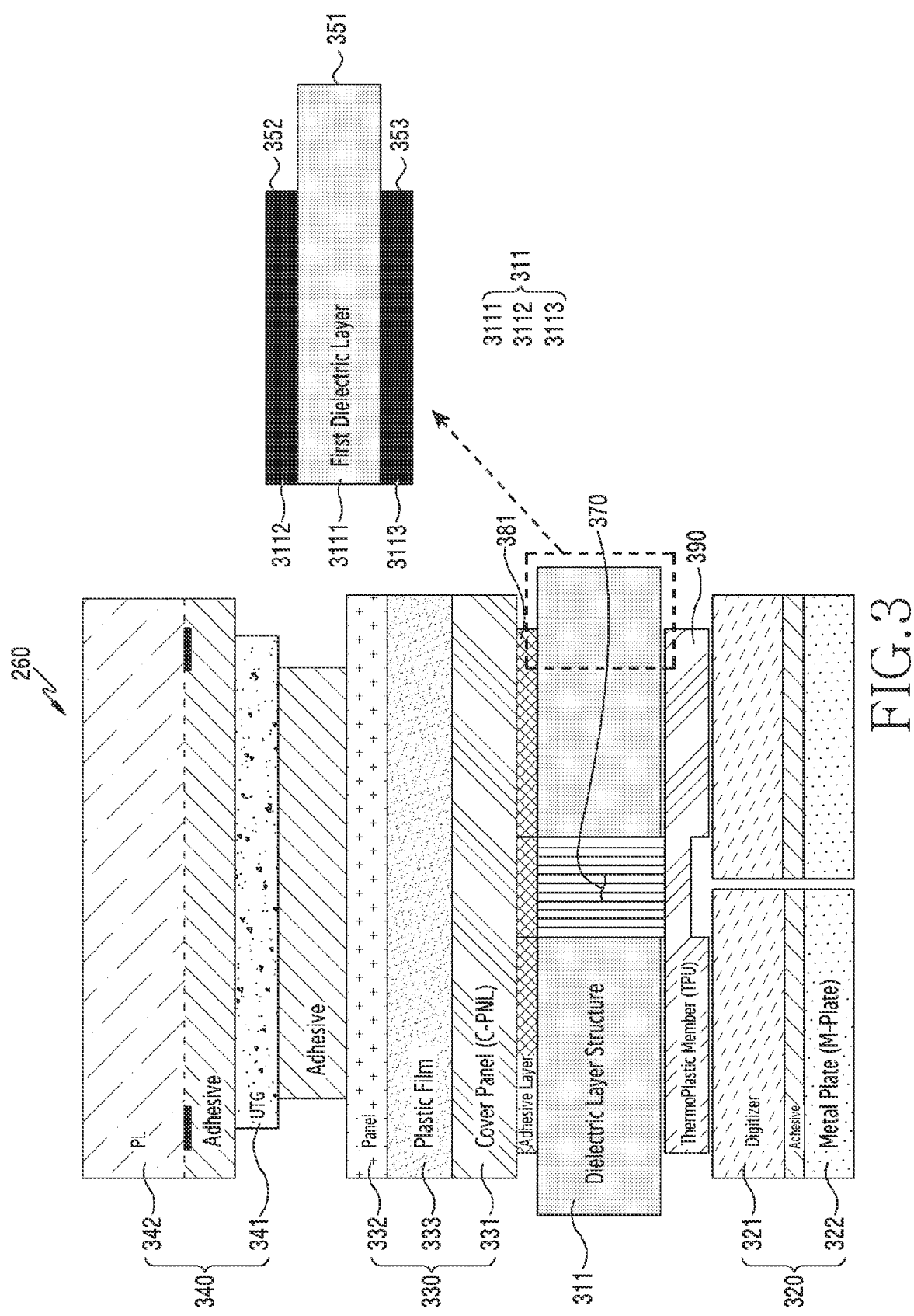
FIG. 3 is a cross-sectional view of a display, cut along an axis B of FIG. 2A, and a dielectric layer structure, according to various embodiments.

FIG. 3 is a cross-sectional view of a display, cut along the axis B of FIG. 2A, and a dielectric layer structure, according to various embodiments.

Referring to FIG. 3, the display 260 (or the display structure) according to an embodiment may include a plurality of layers. According to an embodiment, the display 260 may include a cover glass 340, a display panel 330 disposed adjacent to one face of the cover glass 340, a dielectric layer structure 311 disposed under the display panel 330, and a first layer 320 disposed under the dielectric layer structure 311. According to an embodiment (not shown), among the aforementioned components, some components (e.g., a thermoplastic member 390) may be omitted, and another component may be added.

According to an embodiment, the display 260 may include an adhesive (e.g., a Pressure Sensitive Adhesive (PSA)) for coupling the aforementioned plurality of layers. According to an embodiment, in addition to the PSA, the adhesive may include an Optically Clear Adhesive (OCA), a heat-reactive adhesive, or a double-sided tape, but is not limited thereto.

According to an embodiment, the cover glass 340 may include a film layer 342 and a transparent plate 341 (e.g., an Ultra-Thin Glass (UTG)), which are exposed or visible at least in part through the front face of the electronic device 101. The film layer 342 and transparent plate 341 according to an embodiment may be coupled by an adhesive. According to an embodiment, the film layer 342 and the transparent plate 341 may be folded or bent with flexibility. For example, the film layer 342 may be referred to as a polarization film, but is not limited thereto.

According to an embodiment, the display panel 330 may include a panel 332, a plastic film 333 disposed under the panel 332, and a cover panel 331 disposed under the plastic film 333. According to an embodiment, the plastic film 333 may include an adhesive (e.g., PSA) so that the panel 332 and the cover panel 331 are attached to each other. According to an embodiment, the plastic film 333 may be referred to as a polarization film.

According to an embodiment, the panel 332 may be implemented with a touch panel on which electrodes for receiving a touch input, fingerprint recognition, or pen input are disposed. According to an embodiment, the panel 332 may include, for example, and without limitation, an Organic Light Emitting Diode (OLED) panel, a Liquid Crystal Display (LCD), or a Quantum dot Light Emitting Diode (OLED) panel. For example, the display panel 330 may include a plurality of pixels for displaying an image, and one pixel may include a plurality of sub-pixels. For example, one pixel may include three-color sub-pixels, e.g., a red sub-pixel, a green sub-pixel, and a blue sub-pixel. As another example, one pixel may be formed in an RGBG PenTile type, including one red sub-pixel, two green sub-pixels, and one blue sub-pixel.

According to an embodiment, the display 260 may include the dielectric layer structure 311 disposed under the display panel 330. According to an embodiment, at least part of a periphery of the dielectric layer structure 311 may be formed on an outer side of a periphery of the display panel 330. Detailed descriptions thereof will be described below.

According to an embodiment, since an adhesive layer 381 is disposed between the display panel 330 and the dielectric layer structure 311, the dielectric layer structure 311 may be attached under the display panel 330. According to an embodiment, the adhesive layer 381 may be disposed such that a shape of the adhesive layer 381 corresponds to a shape of the dielectric layer structure 311 or a periphery of the adhesive layer 381 is formed on an inner side of a periphery of the dielectric layer structure 311. According to an embodiment, the adhesive layer 381 may be disposed such that at least part of the periphery of the adhesive layer 381 corresponds to the periphery of the dielectric layer structure 311.

According to an embodiment, the dielectric layer structure 311 may include a lattice pattern 370 in at least some regions. For example, the dielectric layer structure 311 may include the lattice pattern 370 in a region adjacent to a folding axis (e.g., the folding axis A of FIG. 2A). According to an embodiment, since the dielectric layer structure 311 includes the lattice pattern 370 in the region adjacent to the folding axis, when the electronic device 101 switches to a folded state (e.g., FIG. 2B) or an unfolded state (e.g., FIG. 2A), the dielectric layer structure 311 and a plurality of layers to which the dielectric layer structure 311 is attached may be folded or unfolded according to each state.

According to an embodiment, the display 260 may further include the thermoplastic member 390 (e.g., a Thermoplastic Poly Urethane (TPU)) disposed under the dielectric layer structure 311. According to an embodiment, since the display 260 includes the thermoplastic member 390, damage to the display panel 330, the dielectric layer structure 311, and/or the first layer 320 may be prevented and/or reduced. For example, since the display 260 includes the thermoplastic member 390, bubbles produced between the plurality of layers disposed to the display 260 may be prevented and/or reduced. In addition, since the display 260 includes the thermoplastic member 390, foreign substances may be prevented and/or reduced from entering into the plurality of layers disposed to the display 260.

According to an embodiment, the display 260 may include the first layer 320 disposed under the dielectric layer structure 311. According to an embodiment, the first layer 320 may include at least one of a digitizer 321 and a metal plate 322. For example, the first layer 320 may include the metal plate 322 disposed under the dielectric layer structure 311.

According to an embodiment, the digitizer 321 and the metal plate 322 may be adhered by an adhesive. For example, the adhesive may be attached under the digitizer 321, and the metal plate 322 may be attached under the digitizer 321 by the adhesive.

According to an embodiment, the first layer 320 may be formed in a disconnected manner in a region corresponding to the folding axis (e.g., the folding axis A of FIG. 2A). According to an embodiment, since the first layer 320 is formed in the disconnected manner in the region corresponding to the folding axis (e.g., the folding axis A of FIG. 2A), when the electronic device 101 switches to the folded state (e.g., FIG. 2B) or the unfolded state (e.g., FIG. 2A), the first layer 320 may be folded or unfolded according to each state. According to an embodiment (not shown), the first layer 320 may have flexibility and may be formed across the folding axis.

According to an embodiment, the digitizer 321 may include a device capable of detecting an input for an x-position and/or a y-position, and may detect an input device (e.g., an electronic pen) of a magnetic field type. For example, at least one processor (e.g., the processor 120 of FIG. 1) may provide current to the digitizer 321, and the digitizer 321 may generate an electromagnetic field. When the electronic pen approaches the electromagnetic field of the digitizer 321, electromagnetic induction occurs and a resonance circuit of the electronic pen may generate current. The resonance circuit of the electronic pen may use the generated current to produce a magnetic field. The at least one processor may detect a position by scanning strength of the magnetic field applied from the electronic pen to the digitizer 321 throughout the entire region. The at least one processor may perform an operation based on the detected position.

According to an embodiment, the metal plate 322 may be referred to as a shielding layer. According to an embodiment, the metal plate 322 may be formed by applying Magnetic Metal Powder (MMP) to a lower portion of the digitizer 321. The metal plate 322 according to an embodiment may reduce noise by shielding magnetic force caused by surrounding electronic components in addition to a signal which is input from the electronic pen.

According to an embodiment, the dielectric layer structure 311 may include a material for securing rigidity and a lightweight material. According to an embodiment, the dielectric layer structure 311 may have a structure in which a layer for securing rigidity and a layer formed of the lightweight material are stacked. According to an embodiment, since the dielectric layer structure 311 has rigidity, the flexible display 260 may secure rigidity. According to an embodiment, since at least part of the dielectric layer structure 311 is formed of the lightweight material, the flexible display 260 may be reduced in weight.

According to an embodiment, the dielectric layer structure 311 may include a first dielectric layer 3111, a second dielectric layer 3112 disposed on one face of the first dielectric layer 3111 adjacent to the display panel 330, and a third dielectric layer 3113 disposed under the first dielectric layer 3111. According to an embodiment (not shown), one of the second dielectric layer 3112 and the third dielectric layer 3113 may be omitted.

According to an embodiment, the first dielectric layer 3111 may be formed of a lightweight material. According to an embodiment, the first dielectric layer 3111 may include a dielectric material having a permittivity less than or equal to a specified value. For example, the first dielectric layer 3111 may be formed of a Glass Fiber Reinforced Plastic (GFRP) having a permittivity less than or equal to 6, but is not limited thereto.

According to an embodiment, at least part of the second dielectric layer 3112 and/or the third dielectric layer 3113 may be formed of a material having rigidity greater than or equal to a specified value. For example, the second dielectric layer 3112 and the third dielectric layer 3113 may have rigidity greater than a rigidity of the first dielectric layer 3111. According to an embodiment, since the second dielectric layer 3112 and the third dielectric layer 3113 are formed of a Carbon Fiber Reinforced Plastic (CFRP) having a high permittivity, it is possible to secure the rigidity of the flexible display 260.

According to an embodiment, at least part of the second dielectric layer 3112 and/or third dielectric layer 3113 may include a dielectric material having a permittivity greater than or equal to a specified value. For example, the second dielectric layer 3112 and the third dielectric layer 3113 may be formed of a CFRP having a permittivity greater than or equal to 200, but is not limited thereto. For another example, the second dielectric layer 3112 and the third dielectric layer 3113 may have different permittivities.

According to an embodiment, a second periphery 352 of the second dielectric layer 3112 and a third periphery 353 of the third dielectric layer 3113 may be formed on an inner side of a first periphery 351 of the first dielectric layer 3111. According to an embodiment, the second periphery 352 of the second dielectric layer 3112 and the third periphery 353 of the third dielectric layer 3113 may be formed to correspond to each other. Detailed descriptions thereof will be described below.

Figure 4A:
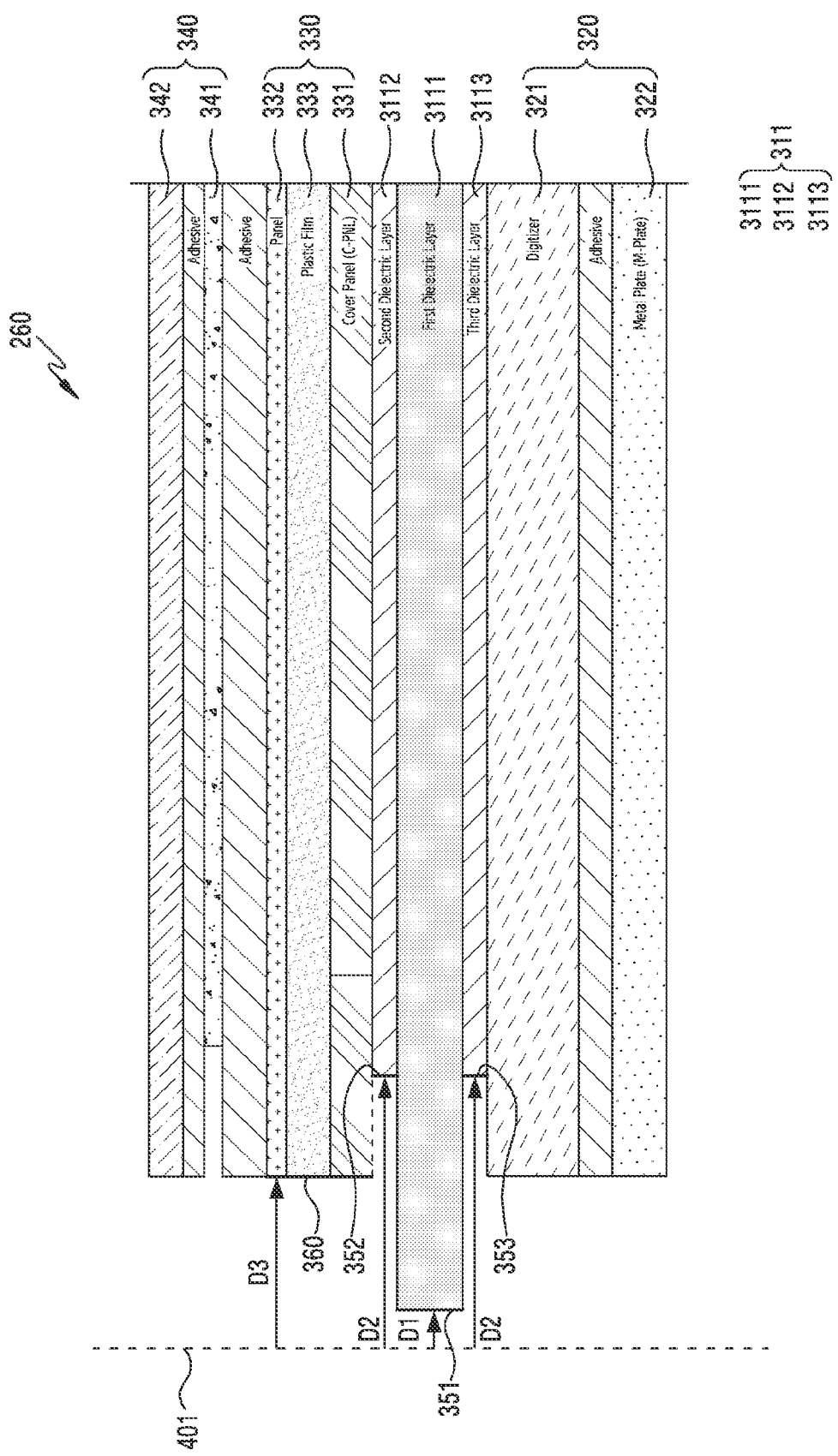
FIG. 4A is a partial cross-sectional view of the display of FIG. 3 according to various embodiments.
Figure 4B:
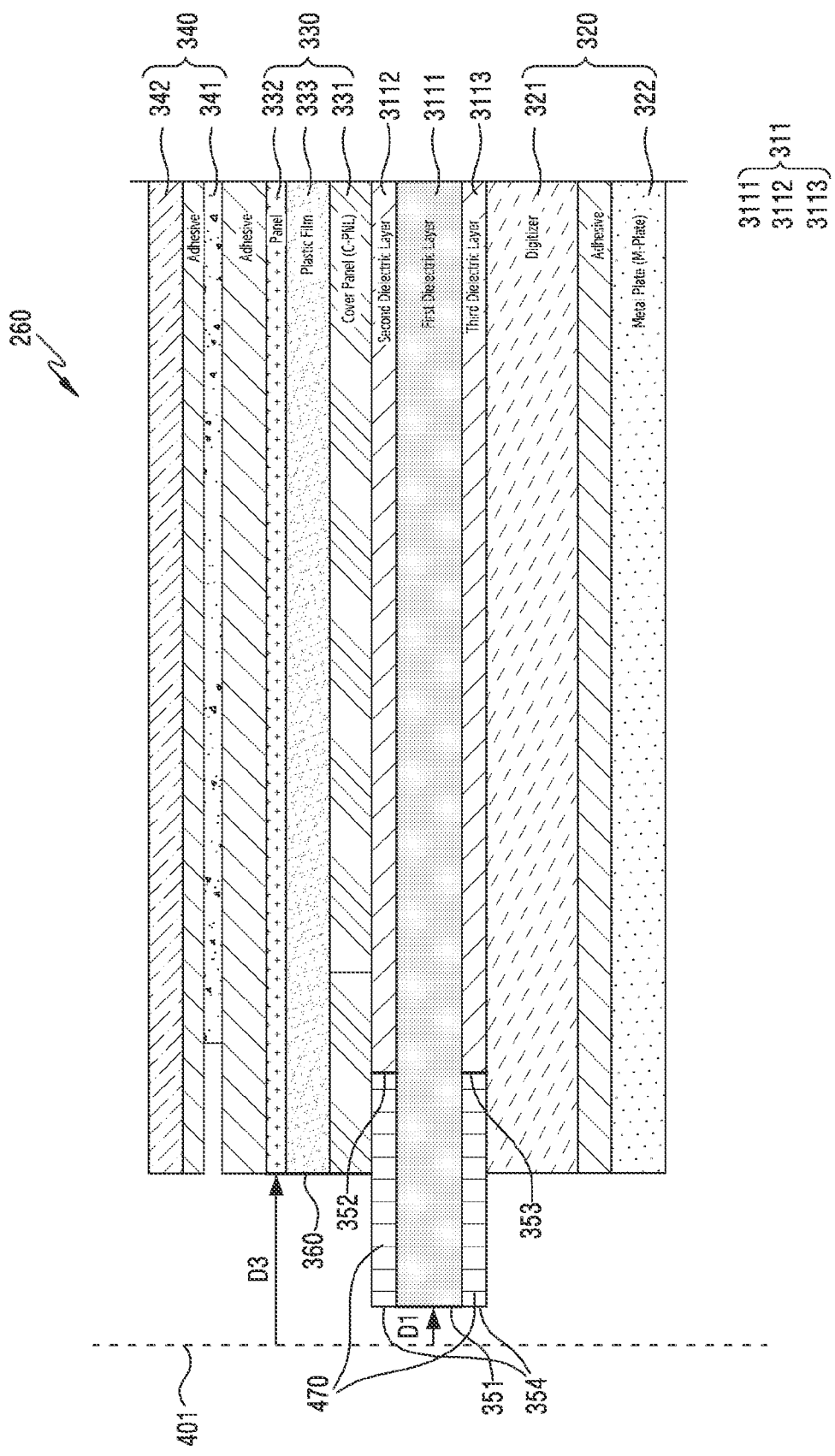
FIG. 4B is a partial cross-sectional view of the display of FIG. 3 according to various embodiments.

FIG. 4A is a partial cross-sectional view of the display of FIG. 3 according to various embodiments. FIG. 4B is a partial cross-sectional view of the display of FIG. 3 according to various embodiments.

Referring to FIG. 4A and FIG. 4B together, the display 260 according to an embodiment may include a plurality of layers, and each of the plurality of layers may be disposed to be spaced apart by a specific distance from a first side face 401 (e.g., the side face of the electronic device 101 of FIG. 2A).

According to an embodiment, the display 260 may include the cover glass 340 forming at least part of a front face of the electronic device, the display panel 330 disposed adjacent to one face of the cover glass 340, the dielectric layer structure 311 disposed under the display panel 330, and the first layer 320 disposed under the dielectric layer structure 311.

According to an embodiment, the dielectric layer structure 311 may include the first dielectric layer 3111, the second dielectric layer 3112 disposed on one face of the first dielectric layer 3111 adjacent to a display panel 330, and the third dielectric layer 3113 disposed on one face of the first dielectric layer 3111 facing a rear face of the electronic device (e.g., the rear face of the electronic device 101 of FIG. 2A). The same reference numerals are used for the same or substantially the same components as those described above, and redundant descriptions may not be repeated.

According to an embodiment, the first side face 401 may be referred to as a side face of the electronic device, formed by a first housing (e.g., the first housing 201 of FIG. 2A). According to an embodiment, the first housing may be referred to as a first side face member.

According to an embodiment, the first dielectric layer 3111 may include the first periphery 351 spaced apart by a first distance D1 from the first side face 401. For example, the first periphery 351 of the first dielectric layer 3111 may be spaced apart by a specific distance (e.g., about 0.2 mm) from the first side face 401. According to an embodiment, since the first periphery 351 is spaced apart by the first distance D1 from the first side face 401, it may be spaced apart by at least part of the first housing 201.

Referring to FIG. 4A, the second dielectric layer 3112 according to an embodiment may include the second periphery 352 spaced apart by a second distance D2 greater than the first distance D1 from the first side face 401. For example, the second periphery 352 of the second dielectric layer 3112 may be spaced apart by a specific distance (e.g., about 1 mm) from the first side face 401, but is not limited thereto.

According to an embodiment, the third dielectric layer 3113 may include the third periphery 353 spaced apart by the second distance D2 greater than the first distance D1 from the first side face 401. For example, the third periphery 353 of the third dielectric layer 3113 may be spaced apart by a specific distance (e.g., about 1 mm) from the first side face 401, but is not limited thereto. For example, the second periphery 352 and the third periphery 353 may be spaced apart by the second distance D2 from the first side face 401.

According to an embodiment, the second periphery 352 and the third periphery 353 may be spaced apart by a distance greater than the first distance D1 from the first side face 401. Distances by which the second periphery 352 and the third periphery 353 are spaced apart from the first side face 401 may be different from each other.

According to an embodiment, the display panel 330 may include a periphery 360 spaced apart by a third distance D3 greater than the first distance D1 and less than the second distance D2 from the first side face 401. For example, the periphery 360 of the display panel 330 may be spaced apart by about 0.5 mm from the first side face 401, but is not limited thereto. According to an embodiment, a periphery of the cover panel 331 may be formed to be spaced apart by a distance greater than the third distance D3 from the first side face 401, but is not limited thereto.

According to an embodiment, at least part of the first periphery 351 of the first dielectric layer 3111 may be formed on an outer side of the periphery 360 of the display panel 330. According to an embodiment, at least part of the second periphery 352 of the second dielectric layer 3112 and at least part of the third periphery 353 of the third dielectric layer 3113 may be formed on an inner side of the periphery 360 of the display panel 330.

According to an embodiment, the first periphery 351 of the first dielectric layer 3111 may form an outermost edge of the display 260. According to an embodiment, the second periphery 352 of the second dielectric layer 3112 and/or the third periphery 353 of the third dielectric layer 3113 may form an innermost periphery of the display 260.

Referring to FIG. 4B, according to an embodiment, the display 260 may further include a dielectric 470 extending to an outer side from the second periphery 352 of the second dielectric layer 3112 and/or the third periphery 353 of the third dielectric layer 3113. According to an embodiment, the display 260 may include the dielectric 470 extending from the second periphery 352 of the second dielectric layer 3112 and/or the third periphery 353 of the third dielectric layer 3113 and having a periphery 354 spaced apart by the first distance D1 from the first side face 401.

According to an embodiment, the dielectric 470 may be formed of a dielectric material having a permittivity less than or equal to a specified value. According to an embodiment, the dielectric 470 may be formed of a dielectric material having a permittivity less than or equal to about 6, but is not limited thereto. For example, the dielectric 470 may include a resin having a permittivity of 2.54.

According to an embodiment, at least part of the periphery 354 of the dielectric 470 may be spaced apart by the first distance D1 from the first side face 401. According to an embodiment (not shown), at least part of the periphery 354 of the dielectric 470 may be formed to be spaced apart by a distance (e.g., the third distance D3) greater than the first distance D1 from the first side face 401.

According to an embodiment, the periphery 354 of the dielectric 470 may be formed on an outer side of the periphery 360 of the display panel 330. According to an embodiment (not shown), at least part of the periphery 354 of the dielectric 470 may be formed to correspond to the periphery 360 of the display panel 330.

According to an embodiment, the periphery 354 of the dielectric 470 may be formed to correspond to the first periphery 351 of the first dielectric 3111. The periphery 354 of the dielectric 470 according to an embodiment may form the outermost edge of the display 260 together with the first periphery 351 of the first dielectric layer 311.

Figure 5A:
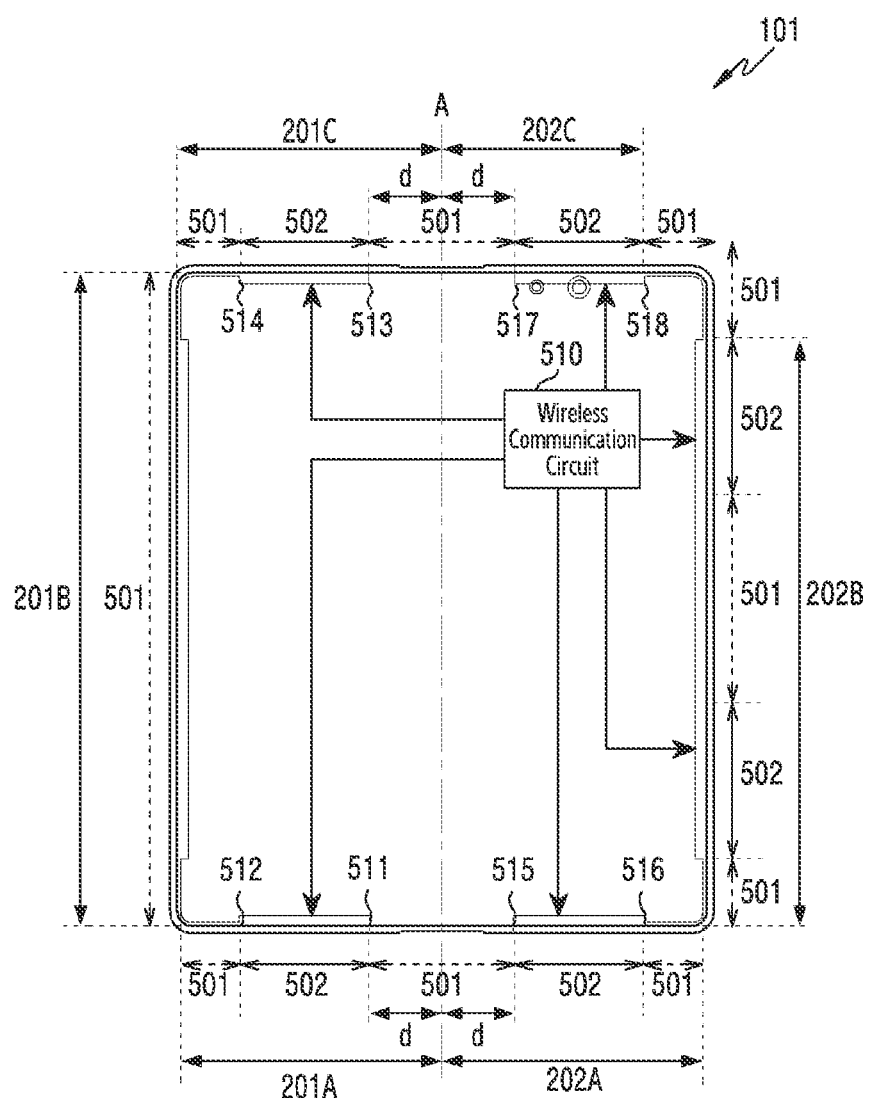
FIG. 5A is a diagram illustrating a periphery of a dielectric layer structure formed in a region corresponding to at least some regions in a housing according to various embodiments.
Figure 5B:
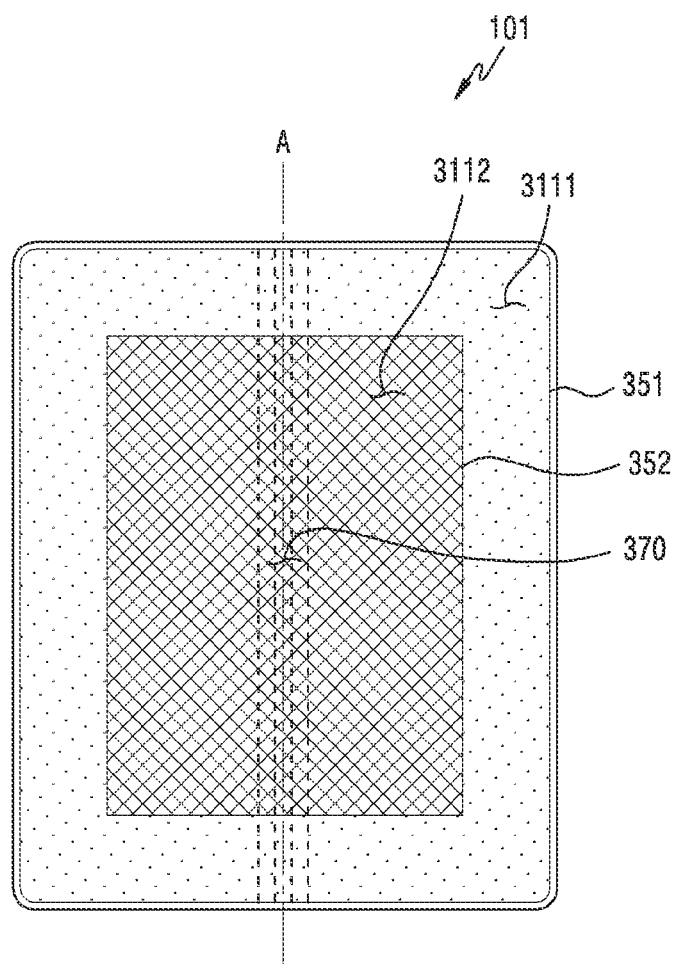
FIG. 5B is a diagram illustrating a display structure when viewed from a direction perpendicular to a front face of an electronic device according to various embodiments.

FIG. 5A is a diagram illustrating a periphery of a dielectric layer structure formed in a region corresponding to at least some regions in a housing according to various embodiments. FIG. 5B is a diagram illustrating a display structure when viewed from a direction perpendicular to a front face of an electronic device according to various embodiments.

Referring to FIG. 5A and FIG. 5B together, the first dielectric layer 3111 according to an embodiment may include the first periphery 351 formed in a region corresponding to at least some regions of the periphery of the housing 200. According to an embodiment, the second dielectric layer 3112 and the third dielectric layer 3113 may respectively include the second periphery 352 and the third periphery 353, corresponding to the first periphery 351 of the first dielectric layer 3111.

According to an embodiment, when viewed in the direction perpendicular to the front face of the electronic device 101, the second dielectric layer 3112 and the third dielectric layer 3113 may be disposed to overlap at least in part. According to an embodiment, when viewed in the direction perpendicular to the front face of the electronic device 101, the second periphery 352 and the third periphery 353 may be disposed to overlap at least in part. For convenience of explanation, hereinafter, descriptions on the second dielectric layer 3112 and the second periphery 352 may be referred to as descriptions on the third dielectric layer 3113 and the third periphery 353, respectively.

Referring to FIG. 5A, the first housing 201 (or the first side face member 2011) according to an embodiment may include a first portion 201A, a second portion 201B extending substantially vertically from the first portion 201A, and a third portion 201C extending substantially vertically from the second portion 201B and substantially parallel to the first portion 201A.

According to an embodiment, the second housing 202 (or the second side face member 2021) according to an embodiment may include a fourth portion 202A, a fifth portion 202B extending substantially vertically from the fourth portion 202A, and a sixth portion 202C extending substantially vertically from the fifth portion 202B and substantially parallel to the first fourth 202A.

According to an embodiment, the first periphery 351 may be formed in a region corresponding to the first region 501 not acting as an antenna radiator in the first housing 201 and/or the second housing 202.

According to an embodiment, the second periphery 352 may be formed in a region corresponding to at least some regions of the first portion 201A and/or third portion 201C of the first housing 201.

According to an embodiment, the second periphery 352 may be formed in a region corresponding to the second region 502 in which power is supplied from a wireless communication circuit 510 (e.g., the wireless communication module 192 of FIG. 1) in the first housing 201 and/or the second housing 202. According to an embodiment, the second periphery 352 may be formed in a region corresponding to the second region 502 acting as an antenna radiator by supplying power from the wireless communication circuit 510 in the first housing 201 and/or the second housing 202. According to an embodiment, the second periphery 352 may be formed to be spaced apart by a specified distance D2 (e.g., 1 mm) from a side face of the electronic device 101, in a region corresponding to the second region 502 in which power is applied by the wireless communication circuit 510 in the first housing 201 and/or the second housing 202.

According to an embodiment, the second periphery 352 may be formed from a first point 511 spaced apart by a specific distance d from a folding axis A on the first portion 201A of the first housing 201 to a second portion 512 on the first portion 201A. According to an embodiment, the second periphery 352 may be formed from a third point 513 spaced apart by the specific distance d from the folding axis A on the third portion 201C of the first housing 201 to a fourth portion 514 on the third portion 201C.

According to an embodiment, the second periphery 352 may be formed to be spaced apart by a specified distance D2 (e.g., about 1 mm) from the side face of the electronic device 101, in a region corresponding to a region except for a corner where the first portion 201A and the second portion 201B meet in the first housing 102 and a corner where the second portion 201B and the third portion 201C meet.

According to an embodiment, the second periphery 352 may be formed in a region corresponding to some regions of the fourth portion 202A, fifth portion 202B, and/or sixth portion 202C of the second housing 202. According to an embodiment, the second periphery 352 may be formed from a fifth point 515 spaced apart by the specific distance d from the folding axis A on the fourth portion 202A of the second housing 202 to a sixth point 516 on the fourth portion 202A. According to an embodiment, the second periphery 352 may be formed from a seventh point 517 spaced apart by the specific distance d from the folding axis A on the sixth portion 202C of the second housing 202 to an eighth portion 518 on the sixth portion 202C. According to an embodiment, the second periphery 352 may be formed in a region corresponding to at least some regions in the fifth portion 202B. According to an embodiment, the second periphery 352 may be formed to be spaced apart by a specified distance D2 (e.g., about 1 mm) from the side face of the electronic device 101, in a region corresponding to a region except for a corner where the fourth portion 202A and the fifth portion 202B meet in the second housing 202 and a corner where the fifth portion 202B and the sixth portion 202C meet.

Referring to FIG. 5B, the first periphery 351 of the first dielectric layer 3111 and the second periphery 352 of the second dielectric layer 3112 according to an embodiment may be formed to have a shape corresponding to the periphery of the display 260.

When viewed from a direction perpendicular to a front face of the electronic device 101 according to an embodiment, the second periphery 352 of the second dielectric layer 3112 may be disposed to an inner side of the first periphery 351 of the first dielectric layer 3111.

According to an embodiment, the first dielectric layer 3111 and the second dielectric layer 3112 may include the lattice pattern 370 in at least some regions. According to an embodiment, the first dielectric layer 3111 and the second dielectric layer 3112 may include the lattice pattern 370 in some regions adjacent to the folding axis A. According to an embodiment, since the first dielectric layer 3111 and the second dielectric layer 3112 include the lattice pattern 370 in some regions adjacent to the folding axis A, when the electronic device 101 switches to the folded state (e.g., FIG. 2B) or the unfolded state (e.g., FIG. 2A), the display 260 and the dielectric layer structure 311 may be folded or unfolded according to each state.

According to an embodiment, at least part of the first dielectric layer 3111 and second dielectric layer 3112 may have a shape corresponding to the front face of the electronic device 101, and may be formed across the folding axis A. According to an embodiment, the first dielectric layer 3111 may be formed by being split about the folding axis A. Detailed descriptions thereof will be described below.

Figure 6A:
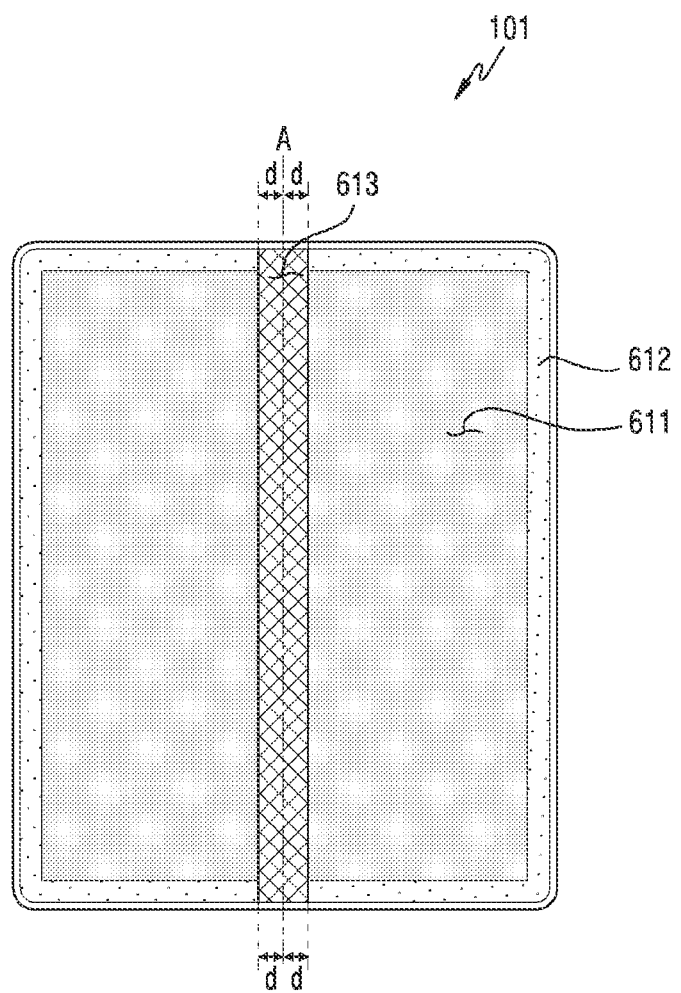
FIG. 6A is a diagram illustrating a dielectric layer structure formed of a different material depending on a region according to various embodiments.
Figure 6B:
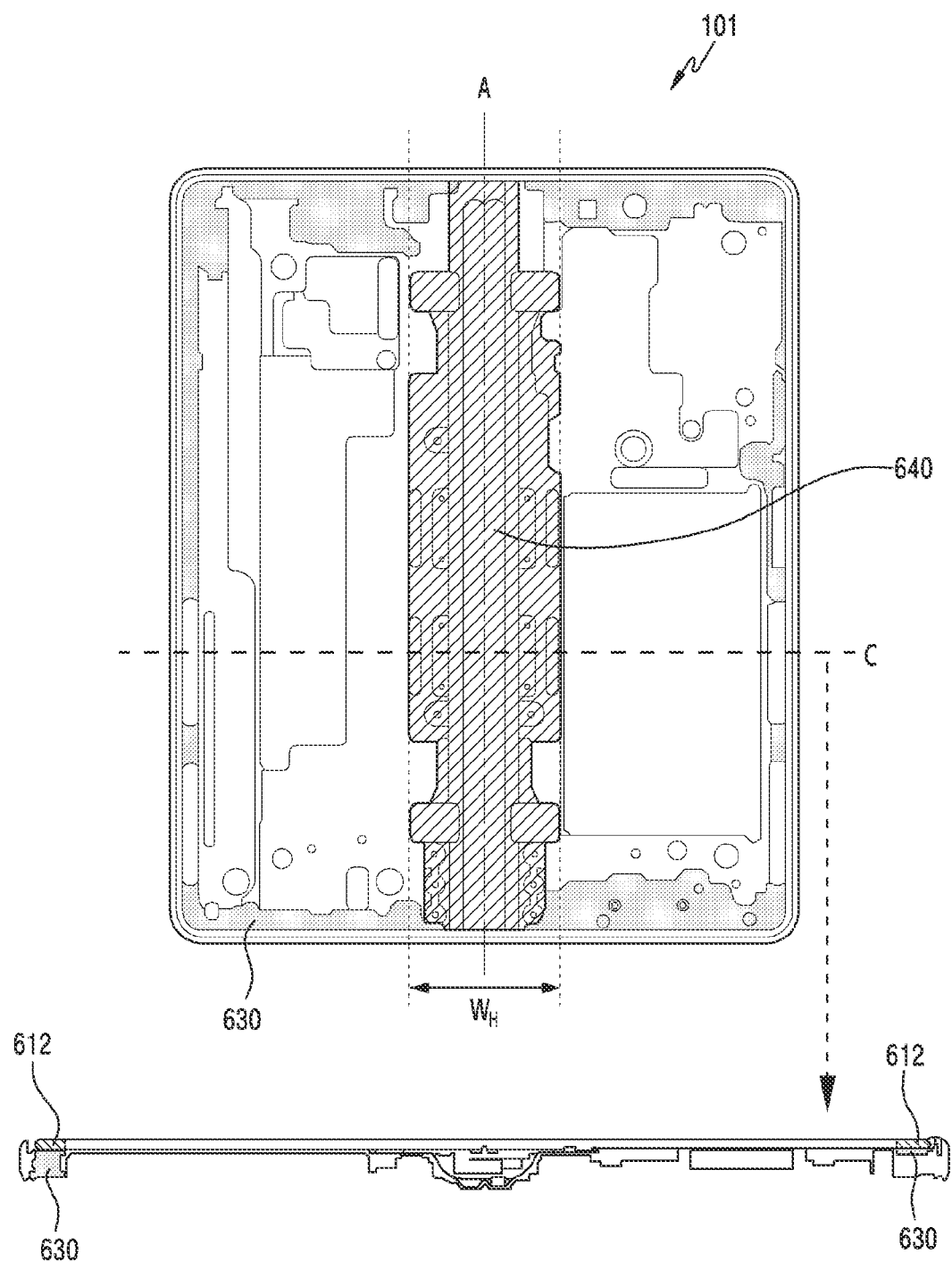
FIG. 6B is a diagram including a cross-sectional view illustrating an electronic device and a display structure mounted on a bracket according to various embodiments.

FIG. 6A is a diagram illustrating a dielectric layer structure formed of a different material depending on a region according to various embodiments. FIG. 6B is a diagram including a cross-sectional view of an electronic device and a display structure mounted on a bracket according to various embodiments.

Referring to FIG. 6A and FIG. 6B together, the electronic device 101 according to an embodiment may include a bracket 630 on which a display structure (e.g., the display 260 of FIG. 3) is mounted, and at least some regions of the display may be disposed to correspond to the bracket 630. According to an embodiment, when viewed from a direction perpendicular to a front face of the electronic device 101, the display may include a plurality of dielectric layers (e.g., the dielectric layer structure 311 of FIG. 3) formed of a material distinctive depending on a region.

The electronic device 101 according to an embodiment may include the bracket 630 and the display structure mounted on the bracket 630. According to an embodiment, the bracket 630 may be formed through ejaculation. According to an embodiment, the bracket 630 may be formed inside a housing (e.g., the housing 200 of FIG. 2A) through ejaculation.

According to an embodiment, a first dielectric layer (e.g., the first dielectric layer 3111 of FIG. 3) may include a first region 611 formed on an inner side from a first periphery (e.g., the first periphery 351 of FIG. 3) and a second region 612 extending to an outer side from the first region 611 to form the first periphery. According to an embodiment, the first dielectric layer may include the second region 612 adjacent to a side face of the electronic device 101 and the first region 611 formed on an inner side of the second region 612 and adjacent to a center of the electronic device 101.

According to an embodiment, the first region 611 may be formed of a material having high thermal conductivity. For example, the first region 611 may be formed of at least one of a soft graphite resin and a thermal conductive flexible composite resin, but is not limited thereto. According to an embodiment, since the first region 611 may be formed of the material having high thermal conductivity, heat generated from electronic components inside the electronic device 101 may be transferred to a housing or a separate space disposed inside the electronic device 101.

According to an embodiment, the second region 612 may be formed of a dielectric material having a permittivity less than or equal to a specified value. For example, the second region 612 may include a GFRP having a permittivity less than or equal to about 6, but is not limited thereto.

Referring to a cross-sectional view, cut along an axis C, of the electronic device 101 according to an embodiment, the second region 612 may be disposed to be formed in a region corresponding to the bracket 630. According to an embodiment, at least part of the second region 612 of the first dielectric layer may be disposed to the region corresponding to the bracket 630.

According to an embodiment, a second dielectric layer (e.g., the second dielectric layer 3112 of FIG. 3) may be disposed to a third region 613 spaced apart by a specific distance d from the folding axis A.

According to an embodiment, the electronic device 101 may include a hinge structure 640 (e.g., the connection portion 203 of FIG. 2A). According to an embodiment, when viewed from a direction perpendicular to a front face of the electronic device 101, at least part of the third region 613 spaced apart by the specific distance d from the folding axis A may overlap a region in which the hinge structure 640 is disposed. According to an embodiment, the second dielectric layer and/or the third dielectric layer (e.g., the third dielectric layer 3113 of FIG. 3) may be disposed at least in part in the third region 613.

For example, a width $W_H$ of the region in which the hinge structure 640 is disposed may be less than or equal to twice the specific distance d by which the third region 613 is formed from the folding axis A.

$$W_H < 2d \quad \text{[Equation 1]}$$

However, a relationship between the width $W_H$ of the region in which the hinge structure 640 is disposed and the specific distance d by which the third region 613 is formed from the folding axis A is not limited to the equation above. Detailed descriptions thereof will be described below.

Figure 7:
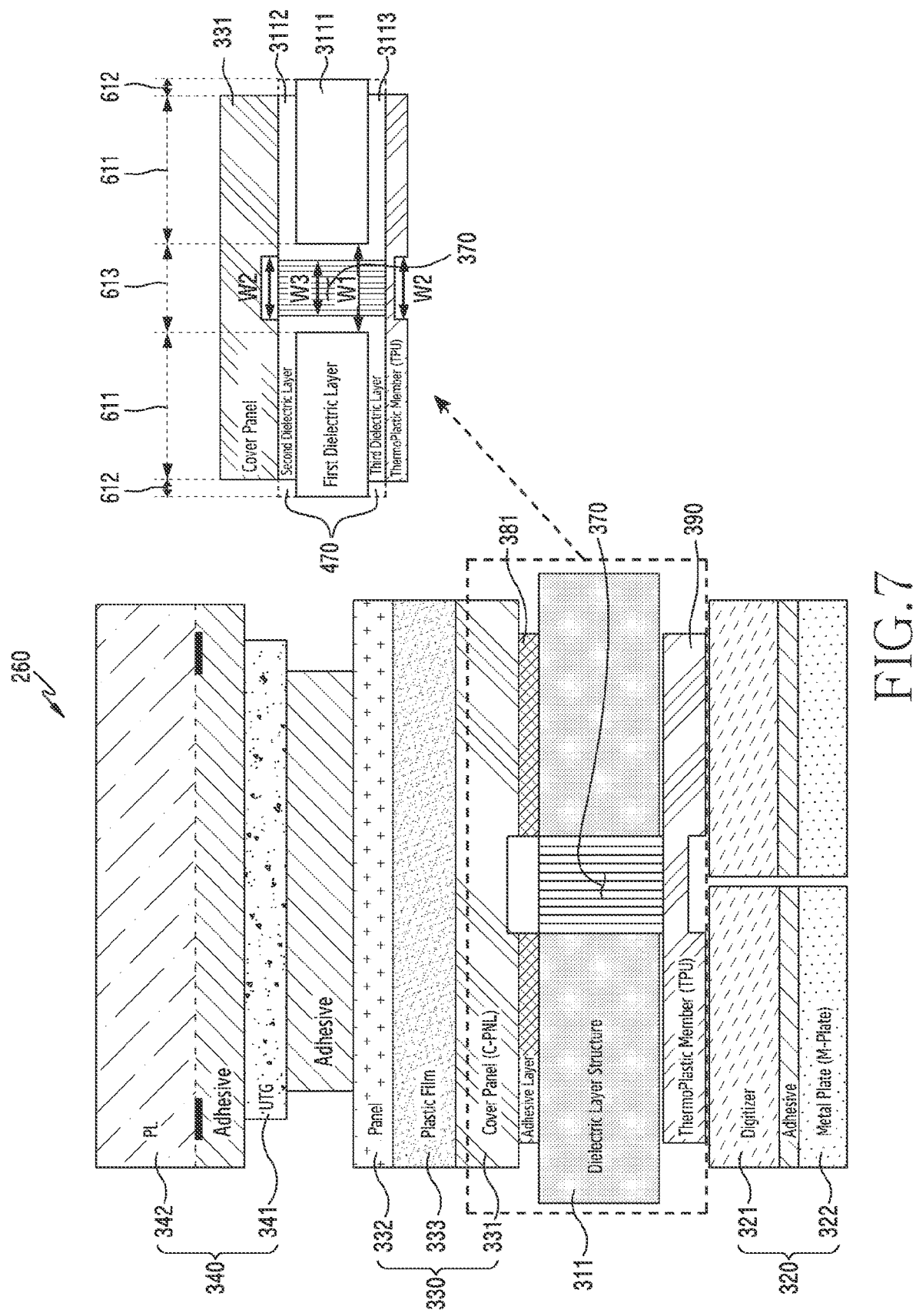
FIG. 7 is a cross-sectional view of a display, cut along an axis C of FIG. 6B, and a dielectric layer structure, according to various embodiments.

FIG. 7 is a cross-sectional view of a display, cut along the axis C of FIG. 6B, and a dielectric layer structure, according to various embodiments.

Referring to FIG. 7, the display 260 according to an embodiment may include the cover glass 340 forming at least part of a front face of the electronic device 101, the display panel 330 disposed adjacent to one face of the cover glass 340, the dielectric layer structure 311 disposed under the display panel 330, and the first layer 320 disposed under the dielectric layer structure 311. The same reference numerals are used for the same or substantially the same components as those described above, and redundant descriptions may not be repeated here.

According to an embodiment, the dielectric layer structure 311 may include the lattice pattern 370 in at least some regions. According to an embodiment, the lattice pattern 370 may be disposed adjacent to the folding axis A. According to an embodiment, the lattice pattern 370 may be disposed to have a third width W3. According to an embodiment, the lattice pattern 370 may be disposed, adjacent to the folding axis A, to have the third width W3.

According to an embodiment, the first dielectric layer 3111 may be formed to be spaced apart by a first width W1 about the lattice pattern 370 or the folding axis A. According to an embodiment, the first dielectric layer 3111 may be formed across at least part of the first region 611 and the second region 612. According to an embodiment, the first dielectric layer 3111 may form at least part of the first region 611 and second region 612. For example, the first dielectric layer 3111 may include a GFRP having a permittivity less than or equal to a specified value (e.g., 6), and may form the first region 611 and the second region 612.

According to an embodiment, the second dielectric layer 3112 and/or the third dielectric layer 3113 may form at least part of the first region 611 and third region 613. For example, the second dielectric layer 3112 and the third dielectric layer 3112 may have a permittivity greater than or equal to about 200, and may form the third region 613.

According to an embodiment, the second dielectric layer 3112 may be disposed to at least partially overlap the first dielectric layer 3111 in the first region 611, when viewed from the direction perpendicular to the front face of the electronic device 101. According to an embodiment, the second dielectric layer 3112 may be disposed to at least partially overlap the first dielectric layer 3111 in the third region 613, when viewed from the direction perpendicular to the front face of the electronic device 101.

According to an embodiment, the cover panel 331 and/or the TPU may include a groove in at least some regions. According to an embodiment, the cover panel 331 and/or the TPU may include a groove having a second width W2 in the at least some regions. However, a width of a groove of the cover panel 331 may not be equal to a width of a groove of the TPU.

According to an embodiment, since the cover panel 331 and/or the TPU include the grooves in the at least some regions, when the electronic device 101 switches to the folded state (e.g., FIG. 2B) or the unfolded state (e.g., FIG. 2A), the cover panel 331 and/or the TPU may be easily folded or unfolded.

According to an embodiment, a relationship of the first width W1, the second width W2, and the third width W3 may be referred according to the following equation.

$$W1 > W2 > W3 \quad \text{[Equation 2]}$$

However, the relationship of the first width W1, the second width W2, and the third width W3 is not limited to the aforementioned equation. At least two of the first width W1, the second width W2, and the third width W3 may be formed to have the same width.

According to an embodiment (not shown), when the TPU is formed in a region adjacent to the folding region 263, W2 may be formed to be greater than W1.

According to an embodiment, the display 260 may further include the dielectric 470 extending to an outer side from the second dielectric layer 3112 and/or the third dielectric layer 3113.

According to an embodiment, the dielectric 470 may be formed of a dielectric material having a permittivity less than or equal to a specified value. According to an embodiment, the dielectric 470 may be formed of a dielectric material having a permittivity less than or equal to about 6, but is not limited thereto. For example, the dielectric 470 may include a resin having a permittivity of 2.54.

Figure 8:
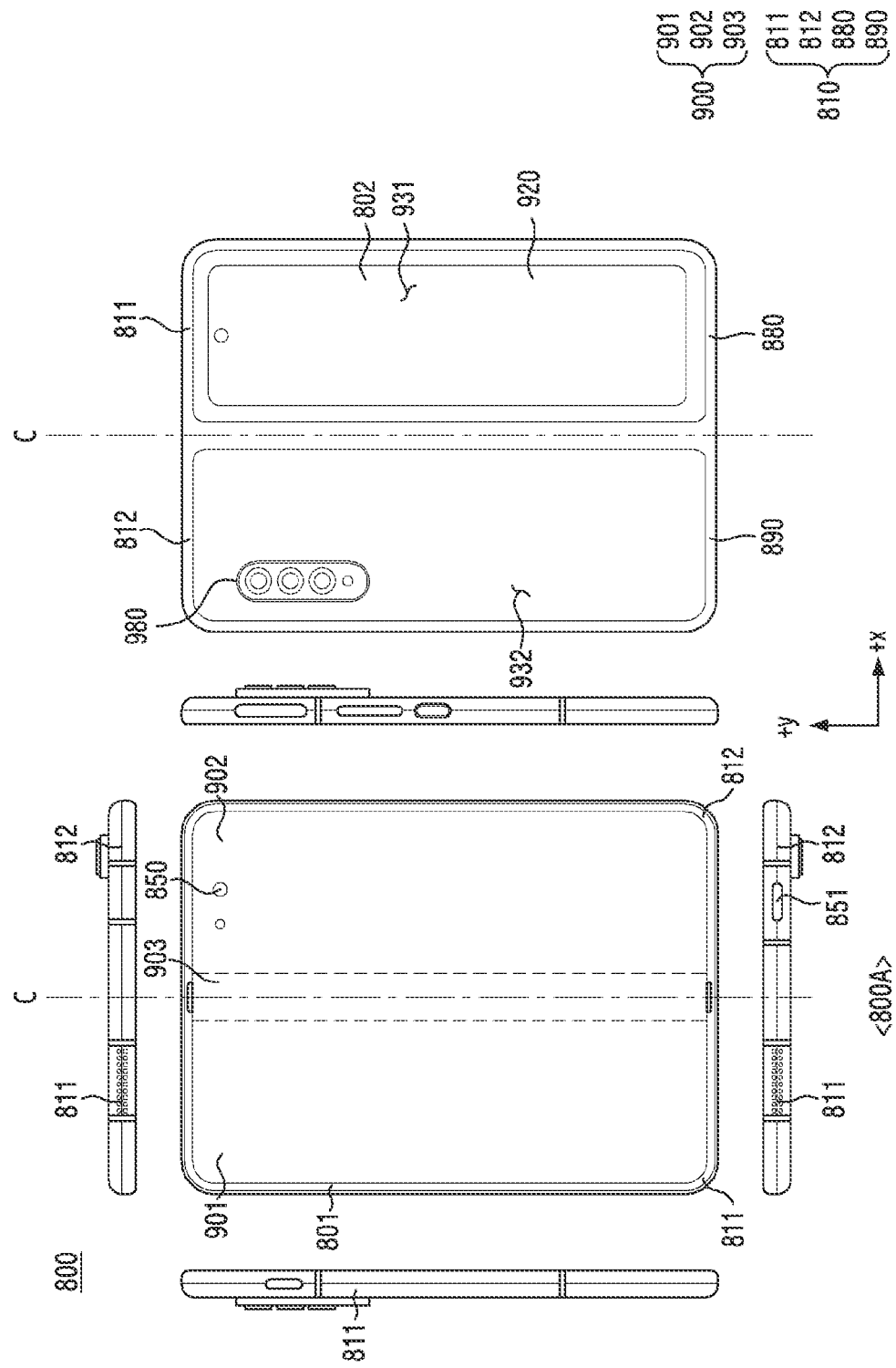
FIG. 8 is a diagram illustrating a first state of an electronic device according to various embodiments.
Figure 9:
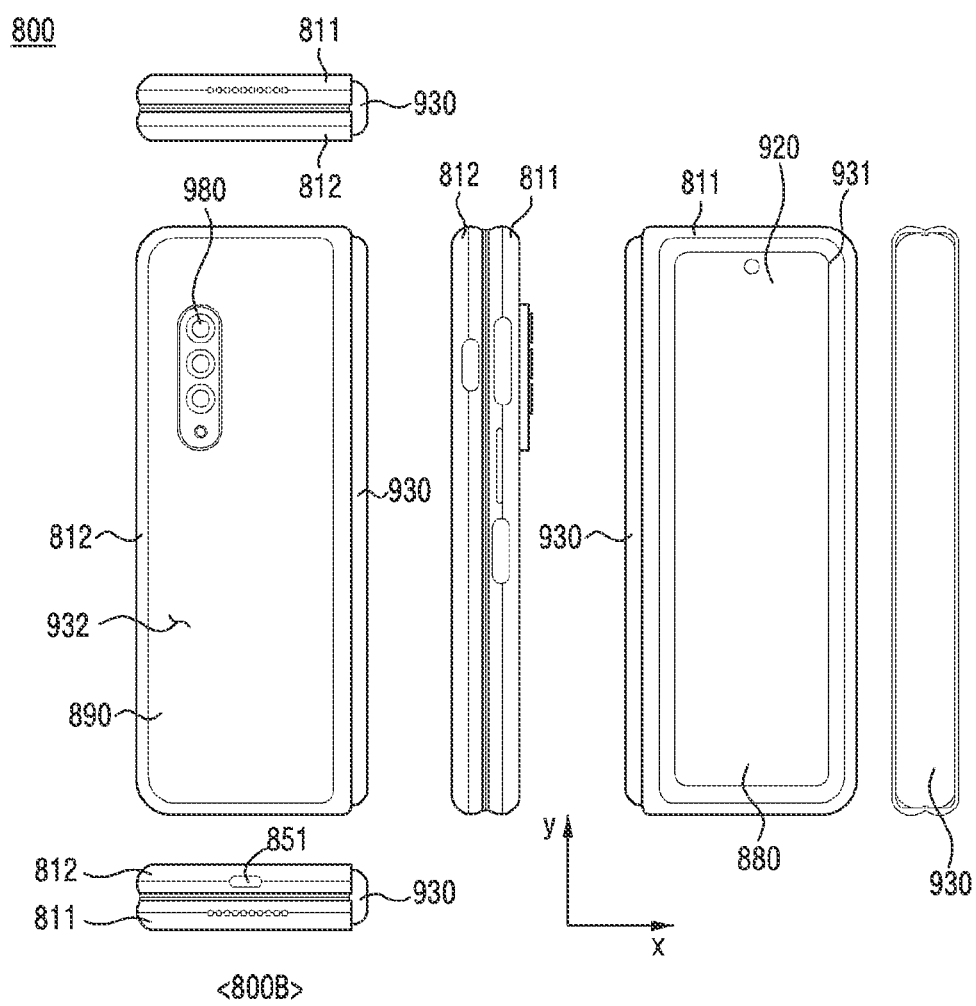
FIG. 9 is a diagram illustrating a second state of an electronic device according to various embodiments.

FIG. 8 is a diagram illustrating a first state of an electronic device according to various embodiments. FIG. 9 is a diagram illustrating a second state of an electronic device according to various embodiments.

Referring to FIG. 8 and FIG. 9, in an embodiment, an electronic device 800 may include a housing 810, a hinge cover 930 which covers a foldable portion of the housing 810, and a flexible or foldable display (hereinafter, simply referred to as a "main display") 900 disposed inside a space formed by the housing 810. In this disclosure, a face on which the main display 900 is disposed may be referred to, for example, as a first face or a front face 801 of the electronic device 800. In addition, a face opposed to the front face 801 may be referred to, for example, as a second face or a rear face 802 of the electronic device 800. Further, a face surrounding a space between the front face 801 and the rear face 802 may be referred to, for example, as a third face or a side face 803 of the electronic device 800.

According to an embodiment, the housing 810 may include a foldable housing. In an embodiment, the housing 810 may include a first housing 811, a second housing 812, a first rear cover 880, and a second rear cover 890. The housing 810 of the electronic device 800 is not limited to the shape and coupling shown in FIG. 8 and FIG. 9, and may be implemented in another shape or in another combination and/or coupling of components. For example, in an embodiment, the first housing 811 and the first rear cover 880 may be formed integrally, and the second housing 812 and the second rear cover 890 may be formed integrally.

According to an embodiment, a state where the electronic device 800 is unfolded may imply a flat state 800A or a first state 800A. For example, a state where the first housing 811 and the second housing 812 are unfolded may correspond to the flat state 800A or the first state 800A. In addition, a state where the electronic device 800 is folded may imply a folded state 800B or a second state 800B. For example, a state where the second housing 812 rotates to be folded with respect to the first housing 811 may correspond to the folded state 800B or the second state 800B.

According to an embodiment, the first housing 811 and the second housing 812 may have different angles or different distances depending on whether the state of the electronic device 101 is the flat state, the folded state, or an intermediate state.

In the illustrated embodiment, the first housing 811 and the second housing 812 may be disposed at both sides about a folding axis (hereinafter, an "axis C"), and may have a shape substantially symmetric about the axis C. However, the first housing 811 and the second housing 812 may have asymmetric shapes in some regions. For example, unlike the first housing 811, the second housing 812 may further include a USB hole 851. In other words, the first housing 811 and the second housing 812 may include portions having shapes symmetric to each other and portions having shapes asymmetric to each other.

According to an embodiment, the main display 900 may be disposed symmetrically throughout the first housing 811 and the second housing 812.

In an embodiment, at least part of the first housing 811 and second housing 812 may be formed of a metal material or non-metal material having a rigidity and size selected to support the main display 900.

In an embodiment, the first rear cover 880 may be disposed to one side of the axis C of the rear face of the electronic device. For example, the first rear cover 880 may have a substantially rectangular periphery, and the periphery may be enclosed by the first housing 811. Similarly, the second rear cover 890 may be disposed to the other side of the axis C of the rear face of the electronic device, and a periphery thereof may be enclosed by the second housing 812.

In the illustrated embodiment, the first rear cover 880 and the second rear cover 890 may have a substantially symmetric shape about the axis C. However, the first rear cover 880 and the second rear cover 890 do not necessarily have a mutually symmetric shape, and thus in an embodiment, the first rear cover 880 and second rear cover 890 included in the electronic device 800 may have various shapes.

In an embodiment, the first rear cover 880, the second rear cover 890, the first housing 811, and the second housing 812 may form a space in which various components (e.g., a PCB or a battery) of the electronic device 800 may be disposed. In an embodiment, one or more components may be disposed or visually exposed on the rear face of the electronic device 800. For example, at least part of a sub-display 920 may be visually exposed (e.g., visible) through a first rear region 931 of the first rear cover 880. In an embodiment, the sub-display 920 may be disposed to the entirety of the first rear region 931 of the first rear cover 880.

In an embodiment, one or more components or a sensor may be visually exposed through a second rear region 932 of the second rear cover 890. In various embodiments, the sensor may include a proximity sensor and/or a rear camera 980.

The main display 900 may be disposed in a space formed by the housing 810. For example, the main display 900 may be mounted on a recess formed by the housing 810, and may form most of the front face 801 of the electronic device 800.

Accordingly, the front face 801 of the electronic device 800 may include the main display 900, some regions of the first housing 811 adjacent to the main display 900, and some regions of the second housing 812. In addition, the rear face 802 of the electronic device 800 may include the first rear cover 880, some regions of the first housing 811 adjacent to the first rear cover 880, and some regions of the second housing 812 adjacent to the second rear cover 890.

The main display 900 may refer to a display in which at least some regions may be transformed to a flat face or a curved face. In an embodiment, the main display 900 may include a folding region 903, a first display region 901 disposed to one side (e.g., a left side of the folding region 903 of FIG. 8) with respect to the folding region 903, and a second display region 902 disposed to the other side (e.g., a right side of the folding region 903 of FIG. 8).

A region of the main display 900 of FIG. 8 is divided by way of non-limiting example, and the main display 900 may be divided into a plurality of regions (e.g., at least 4 or 2) according to a structure or a function. For example, although the region of the main display 900 may be divided by the axis C (folding axis) or the folding region 903 extending parallel to a y-axis in the embodiment of FIG. 8, in an embodiment, the region of the main display 900 may be divided according to another folding region (e.g., a folding region parallel to an x-axis) or another folding axis (e.g., a folding axis parallel to the x-axis).

In an embodiment, the first display region 901 and the second display region 902 may have a shape substantially symmetric about the folding region 903. However, unlike the first display region 901, the second display region 902 may include a camera hole 850, but in the other regions, may have a shape symmetric to the first display region 901. In other words, the first display region 901 and the second display region 902 may include portions having shapes symmetric to each other and portions having shapes asymmetric to each other.

According to an embodiment, the camera hole 850 may be visually exposed to the outside of the electronic device 800. According to an embodiment, the camera hole 850 may be disposed under the main display 900 and thus may not be visually exposed.

Hereinafter, an operation of the first housing 811 and second housing 812 and each region of the main display 900 according to a state (e.g., a flat state 800A and a folded state 800B) of the electronic device 800 and each region of the main display 900 will be described.

In an embodiment, when the electronic device 800 is in the flat state 800A (e.g., FIG. 8), the first housing 811 and the second housing 812 may be disposed to form an angle of 180 degrees and to face the same direction. A surface of the first display region 901 of the main display 900 and a surface of the second display region 902 may form 180 degrees to each other, and may face the same direction (e.g., a front direction of the electronic device). The folding region 903 may be coplanar with the first display region 901 and the second display region 902.

In an embodiment, when the electronic device 800 is in the folded state 800B (e.g., FIG. 9), the first housing 811 and the second housing 812 may be disposed to face each other. A surface of the first display region 901 of the main display 900 and a surface of the second display region 902 may form a narrow angle (e.g., between 0 to 10 degrees) and may face each other. At least part of the folding region 903 may be formed of a curved face having a specific curvature.

In an embodiment, when the electronic device 800 is in the intermediate state, the first housing 811 and the second housing 812 may be disposed to have a certain angle with each other. A surface of the first display region 901 of the main display 900 and a surface of the second display region 902 may have an angle greater than that in the folded state and less than that in the flat state. At least part of the folding region 903 may be formed of a curved face having a certain curvature. In this case, the curvature may be less than that in the folded state.

Figure 10:
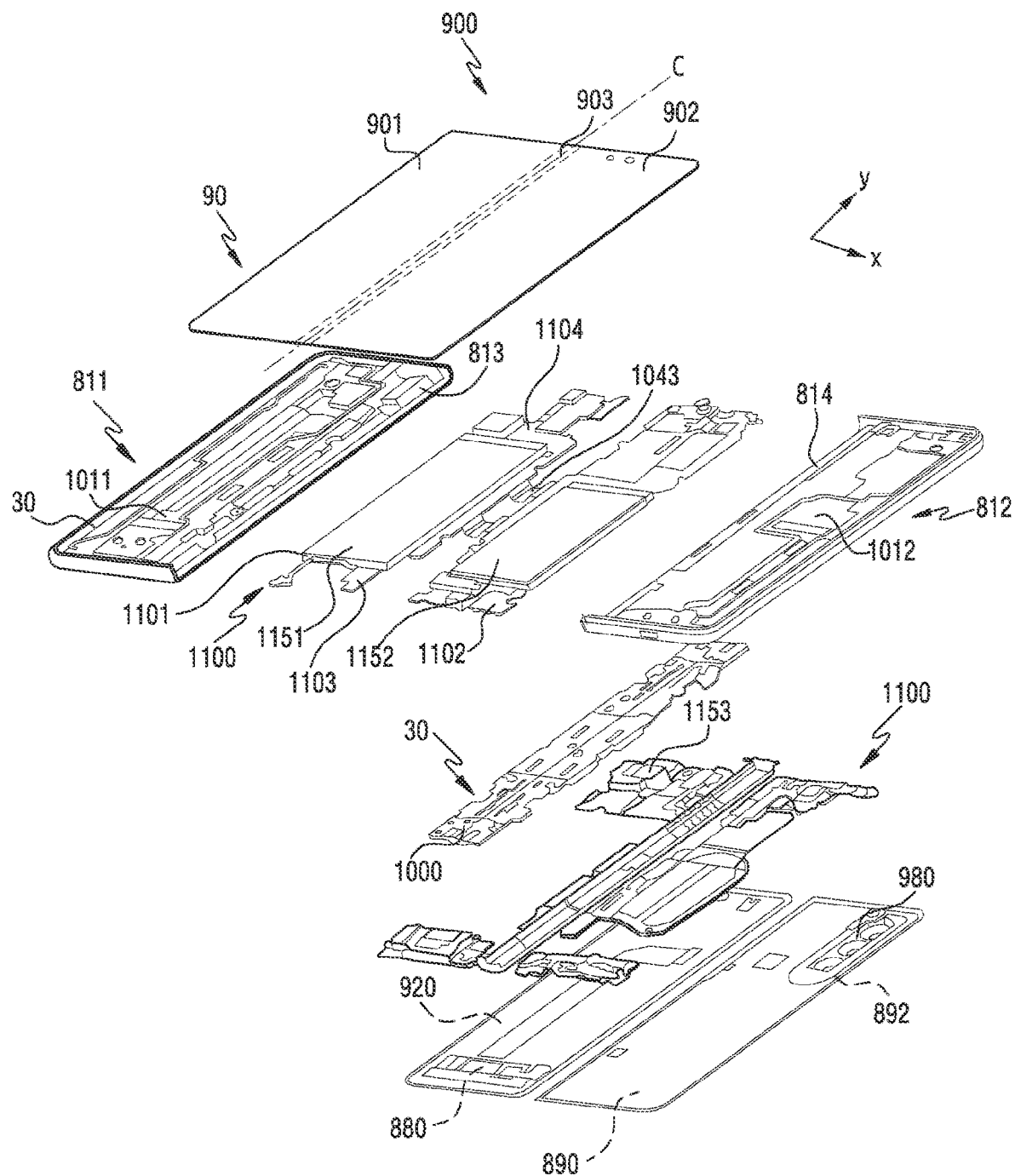
FIG. 10 is an exploded perspective view of an electronic device according to various embodiments.

FIG. 10 is an exploded perspective view of an electronic device according to various embodiments.

Referring to FIG. 10, in an embodiment, the electronic device 800 may include a display unit 90, a bracket assembly 30, a substrate 400, the first housing 811, the second housing 812, the first rear cover 880, and the second rear cover 890. In this disclosure, the display unit 90 may also be called a display module or a display assembly.

The display unit 90 may include the main display 900 and one or more plates or layers (not shown) to which the main display 900 is mounted. In an embodiment, the plate may be disposed between the main display 900 and the bracket assembly 30. The main display 900 may be disposed on at least part of one face (e.g., an upper face of FIG. 12) of the plate. The plate may be formed in a shape corresponding to the main display 900.

The bracket assembly 30 may include a bracket 1010 including a first bracket 1011 and a second bracket 1012, a hinge structure 1000 disposed between the first bracket 1011 and the second bracket 1012, a hinge housing 830 which covers the hinge structure 1000 when viewed from the outside, and a wiring member 1043 (e.g., a Flexible Printed Circuit (FPC)) which traverses the first bracket 1011 and the second bracket 1012.

Referring to FIG. 10, the hinge housing 830 may be disposed between the first housing 811 and the second housing 812 to hide an internal component (e.g., the hinge structure 1000). In an embodiment, the hinge housing 830 may be hidden by part of the first housing 811 and second housing 812 or may be exposed to the outside according to a state (the flat state 800A or the folded state 800B) of the electronic device 800.

For example, when the electronic device 800 is in the flat state 800A as shown in FIG. 8, the hinge housing 830 may not be exposed since it is hidden by the first housing 811 and the second housing 812. For example, when the electronic device 800 is in the folded state 800B (e.g., a fully folded state) as shown in FIG. 9, the hinge housing 830 may be exposed to the outside between the first housing 811 and the second housing 812. For example, in case of the intermediate state in which the first housing 811 and the second housing 812 are folded with a certain angle, the hinge housing 830 may be partially exposed to the outside between the first housing 811 and the second housing 812. However, in this case, a region to be exposed may be smaller than that in the fully folded state. In an embodiment, the hinge housing 830 may include a curved face.

In an embodiment, the bracket assembly 30 may be disposed between the main display 900 and a substrate 1100. For example, the first bracket 1011 may be disposed between a first substrate 1101 and the first display region 901 of the main display 900. The second bracket 1012 may be disposed between a second substrate 1102 and the second display region 902 of the main display 900.

In an embodiment, the wiring member 1043 and the hinge structure 1000 may be partially disposed inside the bracket assembly 30. The wiring member 1043 may be disposed in a direction (e.g., x-axis direction) which traverses the first bracket 1011 and the second bracket 1012. The wiring member 1043 may be disposed in a direction (e.g., x-axis direction) perpendicular to a folding axis (e.g., y-axis or the folding axis (axis C) of FIG. 9) of the folding region 903 of the electronic device 800.

As mentioned above, the substrate 1100 may include the first substrate 1101 disposed to the first bracket 1011 and the second substrate 1102 disposed to the second bracket 1012. The first substrate 1101 and the second substrate 1102 may be disposed inside a space formed by the bracket assembly 30, the first housing 811, the second housing 812, the first rear cover 180, and the second rear cover 190. Components for implementing various functions of the electronic device 800 may be mounted on the first substrate 1101 and the second substrate 1102.

According to an embodiment, the first substrate 1101 may be formed of a plurality of substrates. According to an embodiment, the first substrate 1101 may be formed such that the plurality of substrates are separated. For example, the first substrate 1101 may be formed to be divided into a first PCB 1103 and a second PCB 1104. The first housing 811 and the second housing 812 may be assembled to be coupled at both sides of the bracket assembly 30 in a state where the display unit 90 is coupled to the bracket assembly 30. As described below, the first housing 811 and the second housing 812 may be coupled to the bracket assembly 30 by being slid at both sides of the bracket assembly 30.

In an embodiment, the first housing 811 may include a first rotation support face 813, and the second housing 812 may include a second rotation support face 814 corresponding to the first rotation support face 813. The first rotation support face 813 and the second rotation support face 814 may include a curved face corresponding to a curved face included in the hinge housing 830.

In an embodiment, when the electronic device 800 is in the flat state 800A (e.g., the electronic device of FIG. 8), the first rotation support face 813 and the second rotation support face 814 may cover the hinge housing 830, and thus the hinge housing 830 may not be exposed to the rear face of the electronic device 800 or may be exposed to the minimum extent possible. Meanwhile, when the electronic device 800 is in the folded state 800B (e.g., the electronic device of FIG. 9), the first rotation support face 813 and the second rotation support face 814 may rotate along a curved face included in the hinge housing 830, and thus the hinge housing 830 may be exposed to the rear face of the electronic device 800 to the maximum extent possible.

According to an embodiment, the electronic device 800 may further include a first battery 1151, a second battery 1152, and a speaker module 1153.

According to an embodiment, the first battery 1151 and the second battery 1152 may be mounted inside the housing 810 of the electronic device 800 so as not to be exposed to the outside. For example, the first battery 1151 may be mounted inside the first housing 811. In addition, the second battery 1152 may be mounted inside the second housing 812.

According to an embodiment, the first battery 1151 and the second battery 1152 may be electrically coupled by the wiring member 1043 (e.g., an FPC) disposed between the first housing 811 and the second housing 812.

According to an embodiment, the speaker module 1153 may be disposed inside the first housing 811. For example, the speaker module 1153 may be disposed to one region adjacent to the first battery 1151 inside the first housing 811. According to an embodiment, the speaker module 1153 may not be exposed to the outside of the electronic device 800. According to an embodiment, the speaker module 1153 may be mounted on the second PCB 1104 of the first substrate 1101.

Figure 11:
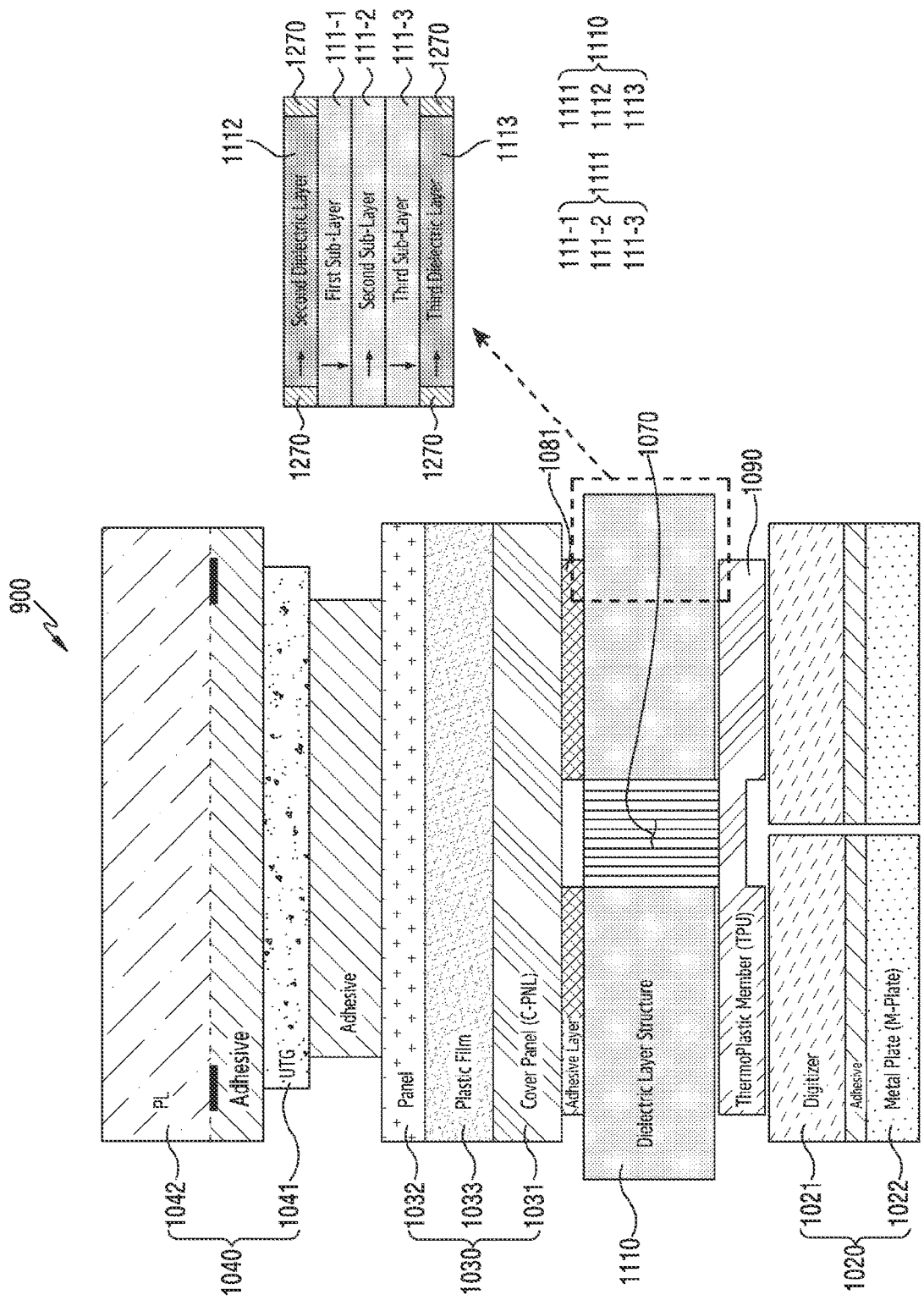
FIG. 11 is a cross-sectional view of a display and a dielectric layer structure according to various embodiments.

FIG. 11 is a cross-sectional view of a display and a dielectric layer structure according to various embodiments.

Referring to FIG. 11, a display 900 (or a display structure) of FIG. 11 may be referred to as the display 260 (or the display structure) of FIG. 3. In addition, components (e.g., the display 1030) of the display 900 of FIG. 11 may be respectively referred to as components of the display 260 of FIG. 3. Redundant descriptions on substantially the same components may not be repeated here.

According to an embodiment, a dielectric layer structure 1110 may include a material for securing rigidity and a lightweight material. According to an embodiment, the dielectric layer structure 1110 may have a structure in which a layer for securing rigidity and a layer formed of the lightweight material are stacked. According to an embodiment, since the dielectric layer structure 1110 has rigidity, the flexible display 900 may secure rigidity. According to an embodiment, since at least part of the dielectric layer structure 1110 is formed of the lightweight material, the flexible display 900 may be reduced in weight.

According to an embodiment, the dielectric layer structure 1110 may include a first dielectric layer 1111, a second dielectric layer 1112 disposed on one face of the first dielectric layer 1111 adjacent to the display panel 1030, and a third dielectric layer 1113 disposed under the first dielectric layer 1111. According to an embodiment (not shown), one of the second dielectric layer 1112 and the third dielectric layer 1113 may be omitted.

According to an embodiment, the first dielectric layer 1111 may be formed of a lightweight material. According to an embodiment, the first dielectric layer 1111 may include a dielectric material having a permittivity less than or equal to a specified value. For example, the first dielectric layer 1111 may be formed of a GFRP having a permittivity less than or equal to 6, but is not limited thereto.

According to an embodiment, at least part of the second dielectric layer 1112 and/or the third dielectric layer 1113 may be formed of a material having rigidity greater than or equal to a specified value. For example, the second dielectric layer 1112 and the third dielectric layer 1113 may have rigidity greater than the first dielectric layer 1111. According to an embodiment, since the second dielectric layer 1112 and the third dielectric layer 1113 are formed of a CFRP having a high permittivity, it is possible to secure the rigidity of the flexible display 900.

According to an embodiment, at least part of the second dielectric layer 1112 and/or third dielectric layer 1113 may include a dielectric material having a permittivity greater than or equal to a specified value. For example, the second dielectric layer 1112 and the third dielectric layer 1113 may be formed of a CFRP having a permittivity greater than or equal to 200, but is not limited thereto. For another example, the second dielectric layer 1112 and the third dielectric layer 1113 may have different permittivities.

According to an embodiment, a second periphery of the second dielectric layer 1112 and a third periphery of the third dielectric layer 1113 may be formed on an inner side of a first periphery of the first dielectric layer 1111. According to an embodiment, the second periphery of the second dielectric layer 1112 and the third periphery of the third dielectric layer 1113 may be formed to correspond to each other.

According to an embodiment, the dielectric layer structure 1110 may further include a dielectric 1270 extending to an outer side from the second periphery of the second dielectric layer 1112 and/or the third periphery of the third dielectric layer 1113. For example, the dielectric layer structure 1110 may include the dielectric 1270 extending from the second periphery of the second dielectric layer 1112 and/or the third periphery of the third dielectric layer 1113 and having a periphery spaced apart by a first distance (e.g., DO from a first side face (e.g., the first side face 401 of FIG. 4B) of the housing 810.

According to an embodiment, the first dielectric layer 1111 may include a plurality of sub-layers. The first dielectric layer 1111 according to an embodiment may include a plurality of sub-layers having structures oriented in different directions. For example, the first dielectric layer 1111 may include a plurality of sub-layers having structures oriented in a direction substantially perpendicular to each other between sub-layers adjacent to each other.

According to an embodiment, the first dielectric layer 1111 may include a first sub-layer 1111-1 disposed adjacent the second dielectric layer 1112 and having a structure oriented in a first direction facing a rear cover (e.g., the first rear cover 880 or second rear cover 890 of FIG. 8).

According to an embodiment, the first dielectric layer 1111 may include a second sub-layer 1111-2 disposed under the first sub-layer 1111-1 and having a structure oriented in a second direction substantially perpendicular to the first direction. In this case, the second direction may be referred to as a direction facing a side face member (e.g., the first side face member 2011 or second side face member 2021 of FIG. 2A) inside the housing 810.

According to an embodiment, the first dielectric layer 1111 may include a third sub-layer 1111-3 disposed under the second sub-layer 1111-2 and having a structure oriented in the first direction.

According to an embodiment, the second dielectric layer 1112 and/or the third dielectric layer 1113 may have a structure oriented in the second direction.

Figure 12:
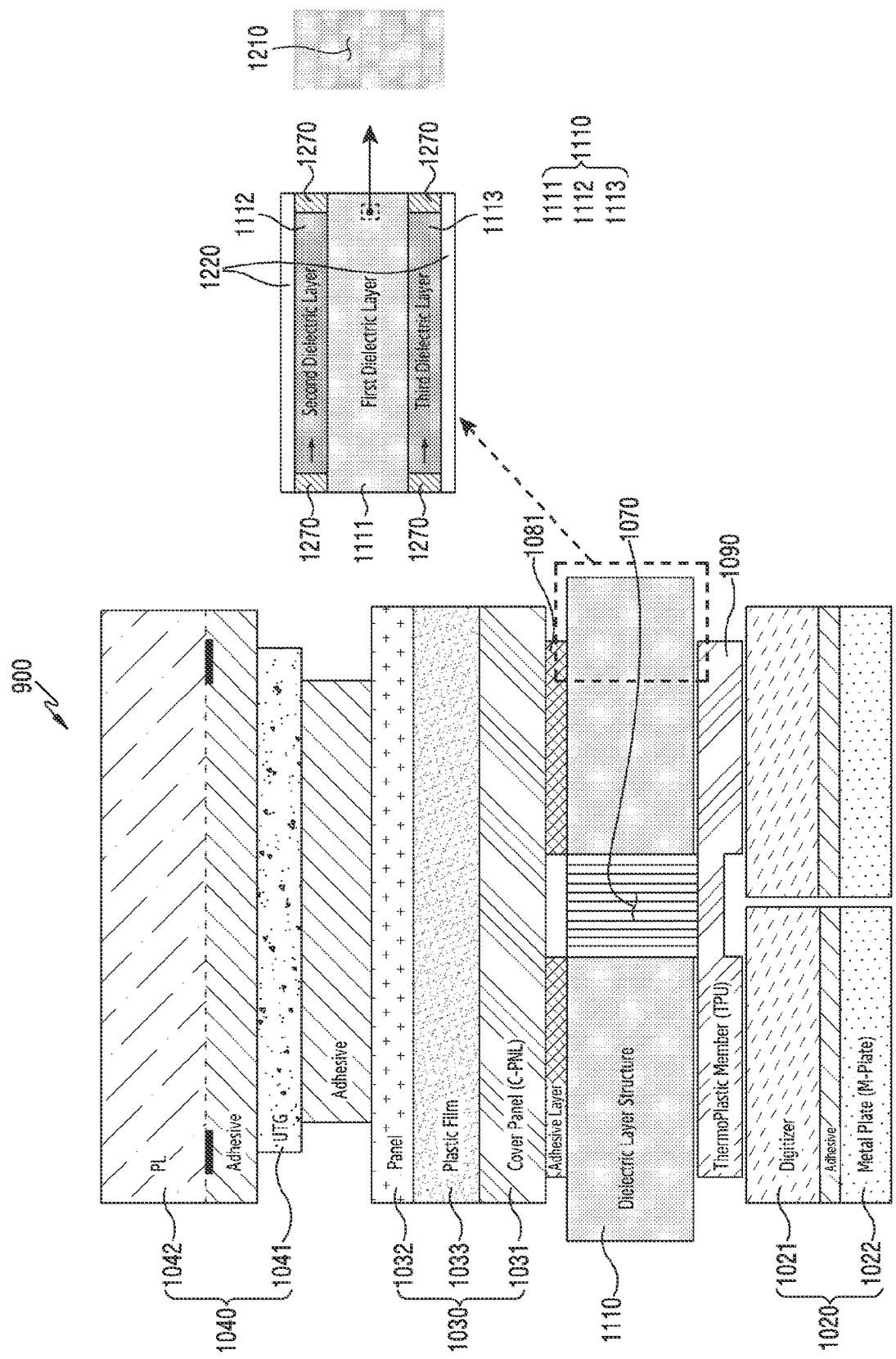
FIG. 12 is a cross-sectional view of a display and a dielectric layer structure according to various embodiments.

FIG. 12 is a cross-sectional view of a display and a dielectric layer structure according to various embodiments.

Referring to FIG. 12, a display 900 (or a display structure) of FIG. 12 may be referred to as the display 260 of FIG. 3 or the display 900 of FIG. 11. In addition, components (e.g., a display 1030) of the display 900 of FIG. 12 may be respectively referred to as components of the display 260 of FIG. 3 or the display 900 of FIG. 11. Redundant descriptions on substantially the same components may not be repeated here.

According to an embodiment, the dielectric layer structure 1110 may include the first dielectric layer 1111, the second dielectric layer 1112 disposed on one face of the first dielectric layer 1111 adjacent to the display panel 1030, and the third dielectric layer 1113 disposed under the first dielectric layer 1111. According to an embodiment (not shown), one of the second dielectric layer 1112 and the third dielectric layer 1113 may be omitted.

According to an embodiment, the first dielectric layer 1111 may be formed of a lightweight material. According to an embodiment, the first dielectric layer 1111 may include a dielectric material having a permittivity less than or equal to a specified value. For example, the first dielectric layer 1111 may be formed of a GFRP having a permittivity less than or equal to 6, but is not limited thereto.

According to an embodiment, at least part of the second dielectric layer 1112 and/or the third dielectric layer 1113 may be formed of a material having rigidity greater than or equal to a specified value. For example, the second dielectric layer 1112 and the third dielectric layer 1113 may have rigidity greater than the first dielectric layer 1111. According to an embodiment, since the second dielectric layer 1112 and the third dielectric layer 1113 are formed of a CFRP having a high permittivity, it is possible to secure the rigidity of the flexible display 900.

According to an embodiment, at least part of the second dielectric layer 1112 and/or third dielectric layer 1113 may include a dielectric material having a permittivity greater than or equal to a specified value. For example, the second dielectric layer 1112 and the third dielectric layer 1113 may be formed of a CFRP having a permittivity greater than or equal to 200, but is not limited thereto. For another example, the second dielectric layer 1112 and the third dielectric layer 1113 may have different permittivities.

According to an embodiment, a second periphery of the second dielectric layer 1112 and a third periphery of the third dielectric layer 1113 may be formed on an inner side of a first periphery of the first dielectric layer 1111. According to an embodiment, the second periphery of the second dielectric layer 1112 and the third periphery of the third dielectric layer 1113 may be formed to correspond to each other.

According to an embodiment, the dielectric layer structure 1110 may further include the dielectric 1270 extending to an outer side from the second periphery of the second dielectric layer 1112 and/or the third periphery of the third dielectric layer 1113. For example, the dielectric layer structure 1110 may include the dielectric 1270 extending from the second periphery of the second dielectric layer 1112 and/or the third periphery of the third dielectric layer 1113 and having a periphery spaced apart by a first distance (e.g., the first distance D1 of FIG. 4B) from a first side face (e.g., the first side face 401 of FIG. 4B) of the housing 810.

According to an embodiment, the first dielectric layer 1111 may include a woven structure 1210. According to an embodiment, at least some region of the first dielectric layer 1111 may have the woven structure 1210. According to an embodiment, the first dielectric layer 1111 may be referred to as a dielectric layer in which a dielectric is woven. For example, the first dielectric layer 1111 may have the woven structure 1210 in which a plurality of dielectrics are formed to cross each other. According to an embodiment, since the first dielectric layer 1111 is formed to have the woven structure 1210 of a single layer, a thickness and weight of the dielectric layer structure 1110 may be minimized or reduced.

According to an embodiment, the dielectric layer structure 1110 may include a coating layer 1220 disposed on one face of the second dielectric layer 1112 adjacent to the display panel 1030 and/or one face of the third dielectric layer 1113 adjacent to a rear cover. According to an embodiment, the dielectric layer structure 1110 includes the coating layer 1220 disposed on one face of the second dielectric layer 1112 and/or one face of the third dielectric layer 1113, thereby improving surface quality of the dielectric layer structure 1110.

Figure 13A:
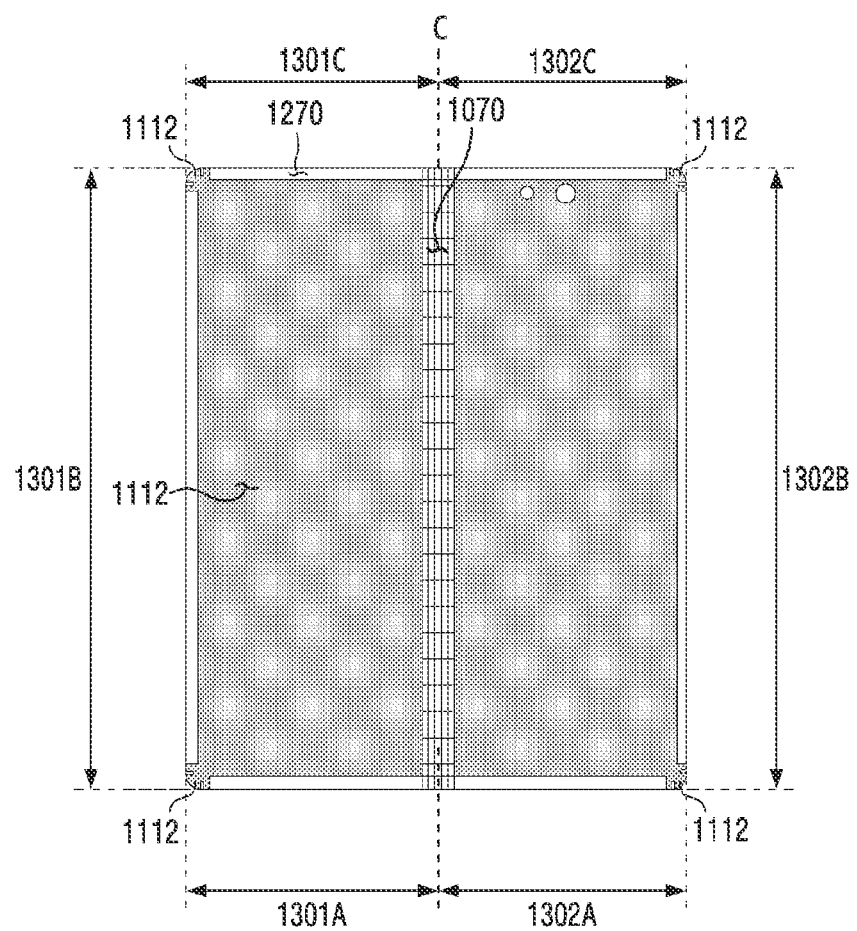
FIG. 13A is a diagram illustrating a dielectric layer structure formed in a region corresponding to a corner of a display according to various embodiments.
Figure 13B:
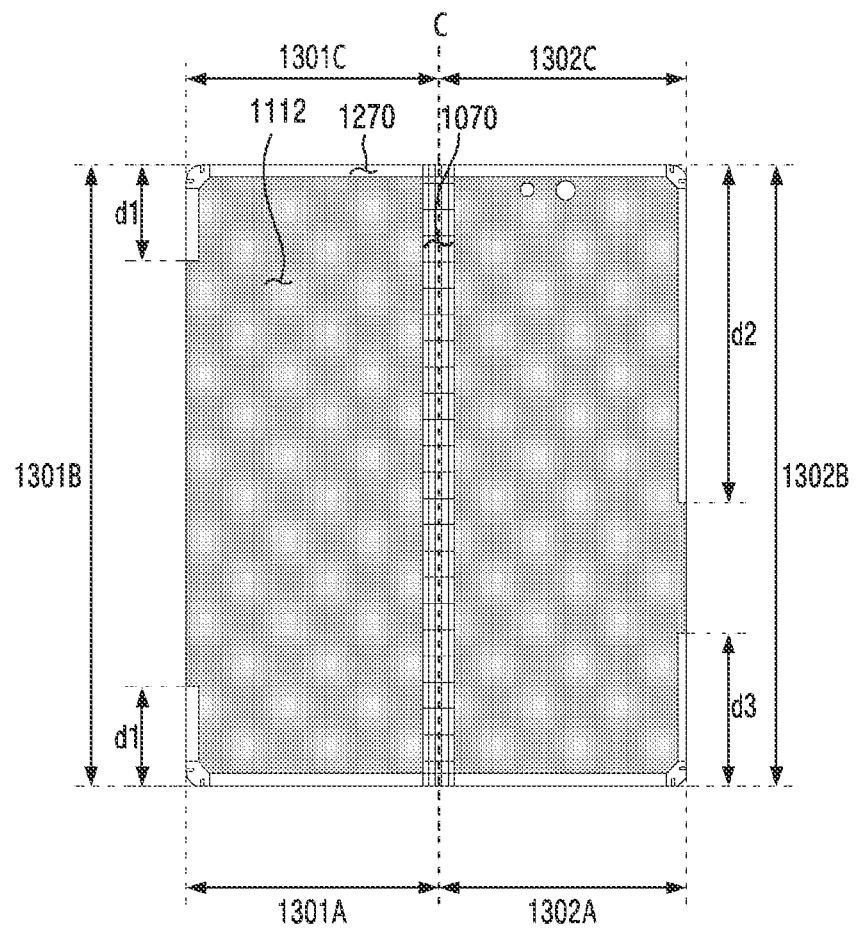
FIG. 13B is a diagram illustrating a dielectric layer structure formed in a region corresponding to some regions of a display according to various embodiments.

FIG. 13A is a diagram illustrating a dielectric layer structure formed in a region corresponding to a corner of a display according to various embodiments. FIG. 13B is a diagram illustrating a dielectric layer structure formed in a region corresponding to some regions of a display according to an embodiment.

Referring to FIG. 13A and FIG. 13B together, the second dielectric layer 1112 and third dielectric layer 1113 according to an embodiment may be formed in a region corresponding to at least part of a periphery of the housing 810 so as to be spaced apart by a specific distance (e.g., D1) from the periphery of the housing 810. The second dielectric layer 1112 and third dielectric layer 1113 according to an embodiment may be formed in the region corresponding to the at least part of the periphery of the housing 810 so as to be adjacent to the periphery of the housing 810.

According to an embodiment, the first housing 811 (or the first side face member 801) according to an embodiment may include a first portion 1301A, a second portion 1301B extending substantially vertically from the first portion 1301A, and a third portion 1301C extending substantially vertically from the second portion 1301B and substantially parallel to the first portion 1301A.

According to an embodiment, the second housing 812 (or the second side face member 802) according to an embodiment may include a fourth portion 1302A, a fifth portion 1302B extending substantially vertically from the fourth portion 1302A, and a sixth portion 1302C extending substantially vertically from the fifth portion 1302B and substantially parallel to the first fourth 1302A.

Referring to FIG. 13A, the second dielectric layer 1112 and third dielectric layer 1113 according to an embodiment may be formed in a region corresponding to a periphery of the housing 810 so as to be adjacent to the periphery of the housing 810. According to an embodiment, the second dielectric layer 1112 and the third dielectric layer 1113 may be formed in a region except for the region corresponding to the corner of the housing 810 so as to be spaced apart by a specific distance (e.g., D1) from the periphery of the housing 810.

For example, the second dielectric layer 1112 and third dielectric layer 1113 according to an embodiment may be formed in a region corresponding to a corner where the first portion 1301A and second portion 1301B of the first housing 811 meet, so as to be adjacent to the periphery of the first housing 811. For example, the second dielectric layer 1112 and third dielectric layer 1113 according to an embodiment may be formed in a region corresponding to a corner where the second portion 1301B and third portion 1301C of the first housing 811 meet, so as to be adjacent to the periphery of the first housing 811. For example, the second dielectric layer 1112 and third dielectric layer 1113 according to an embodiment may be formed in a region except for a region corresponding to the corner where the first portion 1301A and second portion 1301B of the first housing 811 meet, so as to be spaced by at least the specific distance (e.g., D1) from the periphery of the first housing 811. For example, the second dielectric layer 1112 and third dielectric layer 1113 according to an embodiment may be formed in a region except for a region corresponding to the corner where the second portion 1301B and third portion 1301C of the first housing 811 meet, so as to be spaced by at least the specific distance (e.g., D1) from the periphery of the first housing 811.

According to an embodiment, the second dielectric layer 1112 and/or the third dielectric layer 1113 may be formed on the second housing 812 to correspond to a shape formed on the first housing 811.

Referring to FIG. 13B, the second dielectric layer 1112 and third dielectric layer 1113 according to an embodiment may be formed in the region corresponding to the at least part of the periphery of the housing 810 so as to be adjacent to the periphery of the housing 810. According to an embodiment, the second dielectric layer 1112 and the third dielectric layer 1113 may be formed in a region except for the region corresponding to the at least part of the housing 810 so as to be spaced apart by the specific distance (e.g., D1) from the housing 810.

For example, the second dielectric layer 1112 and/or the third dielectric layer 1113 may be formed adjacent to the periphery of the first housing 811, in a region corresponding to a region from a point spaced apart by a first distance d1 from a corner where the second portion 1301B of the first housing 811 meets the first portion 1301A to a point spaced apart by the first distance d1 from a corner where it meets the third portion 1301C. For example, the second dielectric layer 1112 and/or the third dielectric layer 1113 may be formed spaced apart by at least the specific distance (e.g., D1) from the periphery of the first housing 811 until a point spaced apart by the first distance d1 from a corner where the second portion 1301B of the first housing 811 meets the first portion 1301A. For example, the second dielectric layer 1112 and/or the third dielectric layer 1113 may be formed spaced apart by at least the specific distance (e.g., D1) of the first housing 811 until a point spaced apart by the first distance d1 from a corner where the second portion 1301B of the first housing 811 meets the third portion 1301C.

As another example, the second dielectric layer 1112 and/or the third dielectric layer 1113 may be formed adjacent to the periphery of the second housing 812, in a region corresponding to a region from a point spaced apart by a third distance d3 from a corner where the fifth portion 1302B of the second housing 812 meets the fourth portion 1302A to a point spaced apart by a second distance d2 from a corner where it meets the sixth portion 1302C. The second dielectric layer 1112 and/or the third dielectric layer 1113 may be formed spaced apart by at least the specific distance (e.g., D1) from the periphery of the second housing 812 until a point spaced apart by the second distance d2 from a corner where the fifth portion 1302B of the second housing 812 meets the fourth portion 1302A. For example, the second dielectric layer 1112 and/or the third dielectric layer 1113 may be formed spaced apart by at least the specific distance (e.g., D1) of the second housing 812 until a point spaced apart by the third distance d3 from a corner where the fifth portion 1302B of the second housing 812 meets the sixth portion 1302C.

The electronic device according to an example embodiment may include: a housing including a first side face, a second side face, and a hinge coupling the first side face and the second side face, and capable of switching to a folded or unfolded state about the hinge, a rear cover forming a rear face of the electronic device, a wireless communication circuit disposed inside the housing and configured to transmit and/or receive a signal of a specified frequency by supplying power to at least part of the housing, and a display structure coupled to the housing. The display structure may include a cover glass forming at least part of a front face of the electronic device, a display panel disposed adjacent to one face of the cover glass, a first dielectric layer disposed under the display panel. A first periphery of the first dielectric layer may be spaced apart from the first side face by a first distance. The display structure may further include a second dielectric layer disposed on a first face of the first dielectric layer adjacent to the display panel, and a third dielectric layer disposed on a second face of the first dielectric layer facing the rear cover. A second periphery of the second dielectric layer and a third periphery of the third dielectric layer, corresponding to the first periphery of the first dielectric layer, may be spaced apart from the first side face by a second distance greater than the first distance. The first dielectric layer may have a first permittivity, and the second dielectric layer and the third dielectric layer may have a permittivity greater than the first permittivity.

The display structure according to an example embodiment may further include a dielectric extending to an outer side from the second periphery and/or the third periphery. A periphery of the dielectric may be spaced apart from the first side face by the first distance.

According to an example embodiment, the first permittivity of the first dielectric layer may be less than or equal to 6. The second dielectric layer and the third dielectric layer may have a permittivity greater than or equal to 150.

According to an example embodiment, peripheries of the cover glass and display panel may be spaced apart from the first side face by a third distance greater than the first distance and less than the second distance.

According to an example embodiment, the electronic device may include the first layer disposed under the third dielectric layer. The first layer may include at least one of a digitizer and a metal plate.

According to an example embodiment, the first dielectric layer may include a Glass Fiber Reinforced Plastic (GFRP).

According to an example embodiment, the second dielectric layer and/or the third dielectric layer may include a Carbon Fiber Reinforced Plastic (CFRP).

According to an example embodiment, a periphery of the display panel may be disposed between the first periphery and the second periphery, when viewed from a direction perpendicular to the front face of the electronic device.

According to an embodiment, at least one of the first dielectric layer, the second dielectric layer, and the third dielectric layer may have a lattice pattern in at least some regions adjacent to the hinge.

According to an embodiment, the first periphery of the first dielectric layer, the second periphery of the second dielectric layer, and the third periphery of the third dielectric layer may be formed in a region configured as an antenna radiator in the housing wherein power is supplied from the wireless communication circuit.

A display structure according to an example embodiment may include: a cover glass forming an outer face of the display structure, a display panel disposed under the cover class, a first dielectric layer having a first periphery formed at least in part on an outer side of a periphery of the display panel, and disposed under the display panel, a second dielectric layer disposed on a first face of the first dielectric layer adjacent to the display panel, and a third dielectric layer disposed on a second face of the first dielectric layer corresponding to the first face of the first dielectric layer. The second periphery of the second dielectric layer and the third periphery of the third dielectric layer, corresponding to the first periphery of the first dielectric layer, may be formed on an inner side of the first periphery. The first dielectric layer may have a first permittivity. The second dielectric layer and the third dielectric layer may have a permittivity greater than the first permittivity.

According to an example embodiment, the display structure may further include a dielectric extending to an outer side from the second periphery and/or the third periphery. The dielectric may have a periphery corresponding to the first periphery.

According to an example embodiment, the first dielectric layer may include a GFRP. The second dielectric layer and the third dielectric layer may include a CFRP.

According to an example embodiment, the display structure may include the first layer disposed under the third dielectric layer. The first layer may include at least one of a digitizer and a metal plate.

Peripheries of the cover glass and display panel according to an example embodiment may be formed on an inner side of the first periphery and an outer side of the second periphery.

The electronic device according to an example embodiment may include: a housing including a first housing forming the first side face of the electronic device, a second housing forming a second side face of the electronic device corresponding to the first side face, and a hinge coupling the first housing and the second housing, and being capable of switching to a folded or unfolded state about the hinge, a wireless communication circuit disposed inside the housing and configured to transmit and/or receive a signal of a specified frequency by supplying power to at least part of the housing, and a display structure coupled to the housing. The display structure may include a cover glass coupled to the housing and forming at least part of a front face of the electronic device, a display panel disposed adjacent to one face of the cover glass, and a first layer having a first periphery formed at least in part on an outer side of a periphery of the display panel. The first layer may include a first region formed at least in part on an inner side from the first periphery, and a second region extending to an outer side from the first region to form the first periphery. The first region may have a first permittivity. The second region may have a second permittivity less than the first permittivity.

According to an example embodiment, the first region may be formed of at least one of a soft graphite resin and a thermal conductive flexible composite resin.

According to an example embodiment, the second region may include a GFRP.

According to an example embodiment, the electronic device may further include a bracket having the display structure mounted thereon. At least part of the second region may be disposed to correspond to the bracket.

According to an example embodiment, the display structure may include a second layer disposed under the first layer. The second layer may include at least one of a digitizer and a metal plate.

The electronic device according to an example embodiment may include: a housing including a first side face, a second side face corresponding to the first side face, and a hinge coupling the first side face and the second side face, and being capable of switching to a folded or unfolded state about the hinge, a rear cover forming a rear face of the electronic device, a wireless communication circuit disposed inside the housing and configured to transmit and/or receive a signal of a specified frequency by supplying power to at least part of the housing, and a display structure coupled to the housing.

The display structure according to an example embodiment may include: a display panel, a first dielectric layer disposed under the display panel and having a first permittivity. A first periphery of the first dielectric layer may be spaced apart from the first side face by a first distance. The display structure may further include the second dielectric layer disposed on a first face of the first dielectric layer adjacent to the display panel, and the third dielectric layer disposed on a second face of the first dielectric layer facing the rear cover. The first dielectric layer may include a first sub-layer disposed adjacent to the second dielectric layer and having a structure oriented in a first direction facing the rear cover, a second sub-layer disposed under the first sub-layer and having a structure oriented in a second direction substantially perpendicular to the first direction, and a third sub-layer disposed under the second sub-layer and having a structure oriented in the first direction. The second dielectric layer having a permittivity greater than the first permittivity and the third dielectric layer having a permittivity greater than the first permittivity may have a structure oriented in the second direction.

According to an example embodiment, the display structure may further include a dielectric extending to an outer side from the second periphery of the second dielectric layer and/or the third periphery of the third dielectric layer. A periphery of the dielectric may be spaced apart from the first side face by the first distance.

The electronic device according to an example embodiment may include: a housing including a first side face, a second side face corresponding to the first side face, and a hinge coupling the first side face and the second side face, and being capable of switching to a folded or unfolded state about the hinge, a rear cover forming a rear face of the electronic device, a wireless communication circuit disposed inside the housing and configured to transmit and/or receive a signal of a specified frequency by supplying power to at least part of the housing, and a display structure coupled to the housing. The display structure may include: a display panel, a first dielectric layer disposed under the display panel. A first periphery of the first dielectric layer may be spaced apart from the first side face by a first distance. The display structure may further include a second dielectric layer disposed on a first face of the first dielectric layer adjacent to the display panel and having a second periphery corresponding to the first periphery, and the third dielectric layer disposed on a second face of the first dielectric layer facing the rear cover and having a third periphery corresponding to the first periphery. The first dielectric layer may have a woven structure.

According to an example embodiment, the display structure may further include a coating layer disposed on one face of the second dielectric layer adjacent to the display panel and/or one face of the third dielectric layer facing the rear cover.

According to an example embodiment, the display structure may further include a dielectric extending to an outer side from the second periphery and/or the third periphery. A periphery of the dielectric may be spaced apart from the first side face by the first distance.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first side face, a second side face corresponding to the first side face, and a hinge coupling the first side face and the second side face, and being capable of switching to a folded or unfolded state about the hinge;
   a rear cover forming a rear face of the electronic device;
   a wireless communication circuit disposed inside the housing and configured to transmit and/or receive a signal of a specified frequency by supplying power to at least part of the housing; and
   a display structure coupled to the housing, wherein the display structure comprises:
   a cover glass forming at least part of a front face of the electronic device;
   a display panel disposed adjacent to one face of the cover glass;
   a first dielectric layer disposed under the display panel, wherein a first periphery of the first dielectric layer is spaced apart from the first side face by a first distance;
   a second dielectric layer disposed on a first face of the first dielectric layer adjacent to the display panel; and
   a third dielectric layer disposed on a second face of the first dielectric layer facing the rear cover, wherein a second periphery of the second dielectric layer and a third periphery of the third dielectric layer, corresponding to the first periphery of the first dielectric layer, are spaced apart from the first side face by a second distance, the second distance being greater than the first distance,
   wherein the first dielectric layer has a first permittivity, and the second dielectric layer and the third dielectric layer each have a permittivity greater than the first permittivity.

2. The electronic device of claim 1,
   wherein the display structure further comprises a dielectric extending to an outer side from the second periphery and/or the third periphery, and
   wherein a periphery of the dielectric is spaced apart from the first side face by the first distance.

3. The electronic device of claim 1,
   wherein the first permittivity of the first dielectric layer is less than or equal to 6, and
   wherein the second dielectric layer and the third dielectric layer each have a permittivity greater than or equal to 150.

4. The electronic device of claim 1, wherein peripheries of the cover glass and display panel are spaced apart from the first side face by a third distance, the third distance being greater than the first distance and less than the second distance.

5. The electronic device of claim 1, further comprising a first layer disposed under the third dielectric layer,
   wherein the first layer includes at least one of a digitizer and a metal plate.

6. The electronic device of claim 1, wherein the first dielectric layer includes a Glass Fiber Reinforced Plastic (GFRP).

7. The electronic device of claim 1, wherein the second dielectric layer and/or the third dielectric layer include a Carbon Fiber Reinforced Plastic (CFRP).

8. The electronic device of claim 1, wherein a periphery of the display panel is disposed between the first periphery and the second periphery when viewed from a direction perpendicular to the front face of the electronic device.

9. The electronic device of claim 1, wherein at least one of the first dielectric layer, the second dielectric layer, and the third dielectric layer has a lattice pattern in at least some regions proximate the hinge.

10. The electronic device of claim 1, wherein the first periphery of the first dielectric layer, the second periphery of the second dielectric layer, and the third periphery of the third dielectric layer are formed in a region configured to act as an antenna radiator in the housing wherein power is configured to be received from the wireless communication circuit.

11. A display structure comprising:
    a cover glass forming an outer face of the display structure;
    a display panel disposed under the cover class;
    a first dielectric layer having a first periphery formed at least in part on an outer side of a periphery of the display panel, and disposed under the display panel;
    a second dielectric layer disposed on a first face of the first dielectric layer adjacent to the display panel; and
    a third dielectric layer disposed on a second face of the first dielectric layer corresponding to the first face of the first dielectric layer, wherein a second periphery of the second dielectric layer and a third periphery of the third dielectric layer, corresponding to the first periphery of the first dielectric layer, is formed on an inner side of the first periphery,
    wherein the first dielectric layer has a first permittivity, and the second dielectric layer and the third dielectric layer each have a permittivity greater than the first permittivity.

12. The display structure of claim 11, further comprising a dielectric extending to an outer side from the second periphery and/or the third periphery,
    wherein the dielectric has a periphery corresponding to the first periphery.

13. The display structure of claim 11,
    wherein the first dielectric layer includes a Glass Fiber Reinforced Plastic GFRP, and
    wherein the second dielectric layer and the third dielectric layer include a Carbon Fiber Reinforced Plastic (CFRP).

14. The display structure of claim 11, further comprising a first layer disposed under the third dielectric layer, wherein the first layer includes at least one of a digitizer and a metal plate.

15. The display structure of claim 11, wherein peripheries of the cover glass and display panel are formed on an inner side of the first periphery and an outer side of the second periphery.

16. An electronic device comprising:
a housing including a first housing forming a first side face of the electronic device, a second housing forming a second side face of the electronic device corresponding to the first side face, and a hinge coupling the first housing and the second housing, and being capable of switching to a folded or unfolded state about the hinge;
a wireless communication circuit disposed inside the housing and configured to transmit and/or receive a signal of a specified frequency by supplying power to at least part of the housing; and
a display structure coupled to the housing, wherein the display structure comprises:
a cover glass coupled to the housing and forming at least part of a front face of the electronic device;
a display panel disposed adjacent to one face of the cover glass; and
a first layer having a first periphery formed at least in part on an outer side of a periphery of the display panel,
wherein the first layer comprises:
a first region formed at least in part on an inner side from the first periphery; and
a second region extending to an outer side from the first region to form the first periphery,
wherein the first region has a first permittivity, and the second region has a second permittivity less than the first permittivity.

17. The electronic device of claim 16, wherein the first region includes at least one of a soft graphite resin and a thermal conductive flexible composite resin.

18. The electronic device of claim 16, wherein the second region includes a Glass Fiber Reinforced Plastic (GFRP).

19. The electronic device of claim 16, further comprising a bracket having the display structure mounted thereon, wherein at least part of the second region is disposed to correspond to the bracket.

20. The electronic device of claim 16, further comprising a second layer disposed under the first layer, wherein the second layer includes at least one of a digitizer and a metal plate.

21. An electronic device comprising:
a housing including a first side face of the electronic device, a second side face of the electronic device corresponding to the first side face, and a hinge coupling the first side face and the second side face, and being capable of switching to a folded or unfolded state about the hinge;
a rear cover forming a rear face of the electronic device;
a wireless communication circuit disposed inside the housing and configured to transmit and/or receive a signal of a specified frequency by supplying power to at least part of the housing; and
a display structure coupled to the housing, wherein the display structure comprises:
a display panel;
a first dielectric layer disposed under the display panel and having a first permittivity, wherein a first periphery of the first dielectric layer is spaced apart from the first side face by a first distance;
a second dielectric layer disposed on a first face of the first dielectric layer adjacent to the display panel; and
a third dielectric layer disposed on a second face of the first dielectric layer facing the rear cover,
wherein the first dielectric layer comprises:
a first sub-layer disposed adjacent to the second dielectric layer and having a structure oriented in a first direction facing the rear cover;
a second sub-layer disposed under the first sub-layer and having a structure oriented in a second direction substantially perpendicular to the first direction; and
a third sub-layer disposed under the second sub-layer and having a structure oriented in the first direction,
wherein the second dielectric layer has a permittivity greater than the first permittivity and the third dielectric layer has a permittivity greater than the first permittivity and having a structure oriented in the second direction.

22. The electronic device of claim 21, wherein the display structure further comprises a dielectric extending to an outer side from the second periphery of the second dielectric layer and/or the third periphery of the third dielectric layer, and wherein a periphery of the dielectric is spaced apart from the first side face by the first distance.

23. An electronic device comprising:
a housing including a first side face, a second side face corresponding to the first side face, and a hinge coupling the first side face and the second side face, and being capable of switching to a folded or unfolded state about the hinge structure;
a rear cover forming a rear face of the electronic device;
a wireless communication circuit disposed inside the housing and configured to transmit and/or receive a signal of a specified frequency by supplying power to at least part of the housing; and
a display structure coupled to the housing, wherein the display structure comprises:
a display panel;
a first dielectric layer disposed under the display panel, wherein a first periphery of the first dielectric layer is spaced apart from the first side face by a first distance;
a second dielectric layer disposed on a first face of the first dielectric layer adjacent to the display panel and having a second periphery corresponding to the first periphery; and
a third dielectric layer disposed on a second face of the first dielectric layer facing the rear cover and having a third periphery corresponding to the first periphery,
wherein the first dielectric layer has a woven structure.

24. The electronic device of claim 23, wherein the display structure further comprises a coating layer disposed on one face of the second dielectric layer adjacent to the display panel and/or one face of the third dielectric layer facing the rear cover.

25. The electronic device of claim 23, wherein the display structure further comprises a dielectric extending to an outer side from the second periphery and/or the third periphery, and wherein a periphery of the dielectric is spaced apart from the first side face by the first distance.

* * * * *